US010915288B2

(12) United States Patent
Kolahdouzan

(10) Patent No.: US 10,915,288 B2
(45) Date of Patent: Feb. 9, 2021

(54) SYSTEMS AND METHODS FOR SHARING PHYSICAL WRITING ACTIONS

(71) Applicant: Inkerz Pty Ltd, North Sydney (AU)

(72) Inventor: Vahid Kolahdouzan, North Sydney (AU)

(73) Assignee: Inkerz Pty Ltd., St Leonards (AU)

( * ) Notice: Subject to any disclaimer, the term of this patent is extended or adjusted under 35 U.S.C. 154(b) by 97 days.

(21) Appl. No.: 15/562,380

(22) PCT Filed: Mar. 29, 2016

(86) PCT No.: PCT/AU2016/000107
§ 371 (c)(1),
(2) Date: Sep. 27, 2017

(87) PCT Pub. No.: WO2016/154660
PCT Pub. Date: Oct. 6, 2016

(65) Prior Publication Data
US 2018/0284907 A1    Oct. 4, 2018

(30) Foreign Application Priority Data

Mar. 27, 2015    (AU) ................ 2015901117

(51) Int. Cl.
*G06F 3/14*     (2006.01)
*G06F 3/0488*   (2013.01)
(Continued)

(52) U.S. Cl.
CPC .......... *G06F 3/1454* (2013.01); *G06F 3/0304* (2013.01); *G06F 3/0484* (2013.01); *G06F 3/04883* (2013.01); *G09B 5/00* (2013.01); *H04L 12/1813* (2013.01); *H04L 12/1827* (2013.01); *H04L 12/1831* (2013.01); *H04L 29/06176* (2013.01); *G06F 2203/04803* (2013.01)

(58) Field of Classification Search
CPC ..... G06F 3/04883; G06F 3/1454–1462; H04L 12/1813–1831; H04L 29/06176
See application file for complete search history.

(56) References Cited

U.S. PATENT DOCUMENTS 8,402,391 B1    3/2013  Doray et al.
9,754,559 B2 *  9/2017  Emori ................. G06F 3/03545
(Continued)

OTHER PUBLICATIONS

Written Opinion of the International Searching Authority and International Search report of parent PCT/AU2016/000107, dated Jun. 9, 2016. 16 pages.

*Primary Examiner* — Gene W Lee
(74) *Attorney, Agent, or Firm* — FisherBroyles LLP; Ian R. Walsworth

(57) ABSTRACT

A server and computer implemented method for sharing physical writing actions, the method comprising the steps of: detecting, at each of a plurality of computing devices associated with a meeting, one or more physical writing actions being performed on physical writing surfaces; generating writing signals based on the physical writing actions; transmitting the generated writing signals to a server; forwarding, via the server, the writing signals for receipt at the plurality of computing devices associated with the meeting; and each computing device outputting a representation of the physical writing actions.

15 Claims, 23 Drawing Sheets

(51) Int. Cl.
  *H04L 12/18* (2006.01)
  *G06F 3/03* (2006.01)
  *G09B 5/00* (2006.01)
  *G06F 3/0484* (2013.01)
  *H04L 29/06* (2006.01)

(56) References Cited

U.S. PATENT DOCUMENTS

| | | | |
|---|---|---|---|
| 2003/0038788 A1* | 2/2003 | Demartines | G06F 3/0485 345/173 |
| 2003/0163525 A1* | 8/2003 | Hendriks | G06Q 10/10 709/204 |
| 2004/0263486 A1* | 12/2004 | Seni | G06F 3/0485 345/173 |
| 2006/0206564 A1 | 9/2006 | Burns et al. | |
| 2006/0209051 A1 | 9/2006 | Cohen et al. | |
| 2009/0193327 A1* | 7/2009 | Roychoudhuri | G06F 17/241 715/231 |
| 2011/0310066 A1 | 12/2011 | Fermgard et al. | |
| 2012/0231441 A1 | 9/2012 | Parthasarathy | |
| 2013/0063547 A1* | 3/2013 | Kasuya | H04L 12/1813 348/14.08 |
| 2014/0117073 A1* | 5/2014 | Bell | H04L 12/1818 235/375 |
| 2014/0165152 A1* | 6/2014 | Farouki | H04N 7/15 726/4 |
| 2014/0258214 A1* | 9/2014 | Tsukamoto | H04L 12/1831 707/608 |
| 2014/0267081 A1 | 9/2014 | Kreek et al. | |
| 2015/0035938 A1* | 2/2015 | Emori | H04L 12/1827 348/14.08 |
| 2015/0091940 A1* | 4/2015 | Emori | G09G 5/377 345/629 |
| 2016/0170704 A1* | 6/2016 | Tamura | G06F 3/1454 345/2.3 |
| 2018/0323988 A1* | 11/2018 | Beel | H04L 12/1831 |

* cited by examiner

SYSTEMS AND METHODS FOR SHARING PHYSICAL WRITING ACTIONS

FIELD OF THE INVENTION

The present invention relates generally to improved systems and methods for sharing physical writing methods.

BACKGROUND OF THE INVENTION

Existing internet collaboration platforms (and in particular those in the education industry) do not allow for use of pen and paper when it comes to collaborating with other users of the system.

Existing web-conferencing applications (such as WebEx, Adobe connect etc.) are tools that are not specifically designed to replicate a face-to-face environment.

Existing writing detection systems in general are specialized systems that rely on Infra-Red and Ultrasound to detect writing movement.

SUMMARY OF THE INVENTION

It is an object of the present invention to substantially overcome, or at least ameliorate, one or more disadvantages of existing arrangements.

According to a first aspect of the present disclosure, there is provided a server and computer implemented method for sharing physical writing actions, the method comprising the steps of: detecting, at each of a plurality of computing devices associated with a meeting, one or more physical writing actions being performed on physical writing surfaces; generating writing signals based on the physical writing actions; transmitting the generated writing signals to a server; forwarding, via the server, the writing signals for receipt at the plurality of computing devices associated with the meeting; and each computing device outputting a representation of the physical writing actions.

According to a second aspect of the present disclosure, there is provided a server implemented method for sharing physical writing actions, the method comprising the steps of: receiving, at a server, generated writing signals associated with a meeting from two or more computing devices, wherein the generated writing signals are associated with physical writing actions captured by the two or more computing devices; and forwarding, from the server to the computing devices, the generated writing signals associated with the meeting to enable each computing device to output a representation of the physical writing actions.

According to another aspect of the present disclosure, there is provided a computer implemented method for detecting a physical writing action; the method comprising the steps of: accessing an image generated by a camera associated with a computing device; analysing the image to detect a first physical writing action; generating a first writing signal based on the analysis; and outputting the first writing signal.

According to another aspect of the present disclosure, there is provided a computer program product including a computer readable medium having recorded thereon a computer program for implementing any one of the methods described above.

According to another aspect of the present disclosure, there is also provided a server, computing device or electronic device arranged to implement any one of the methods described above.

Other aspects are also disclosed.

BRIEF DESCRIPTION OF THE DRAWINGS

At least one embodiment of the present invention will now be described with reference to the drawings and appendices, in which.

DETAILED DESCRIPTION

Figure 1A:
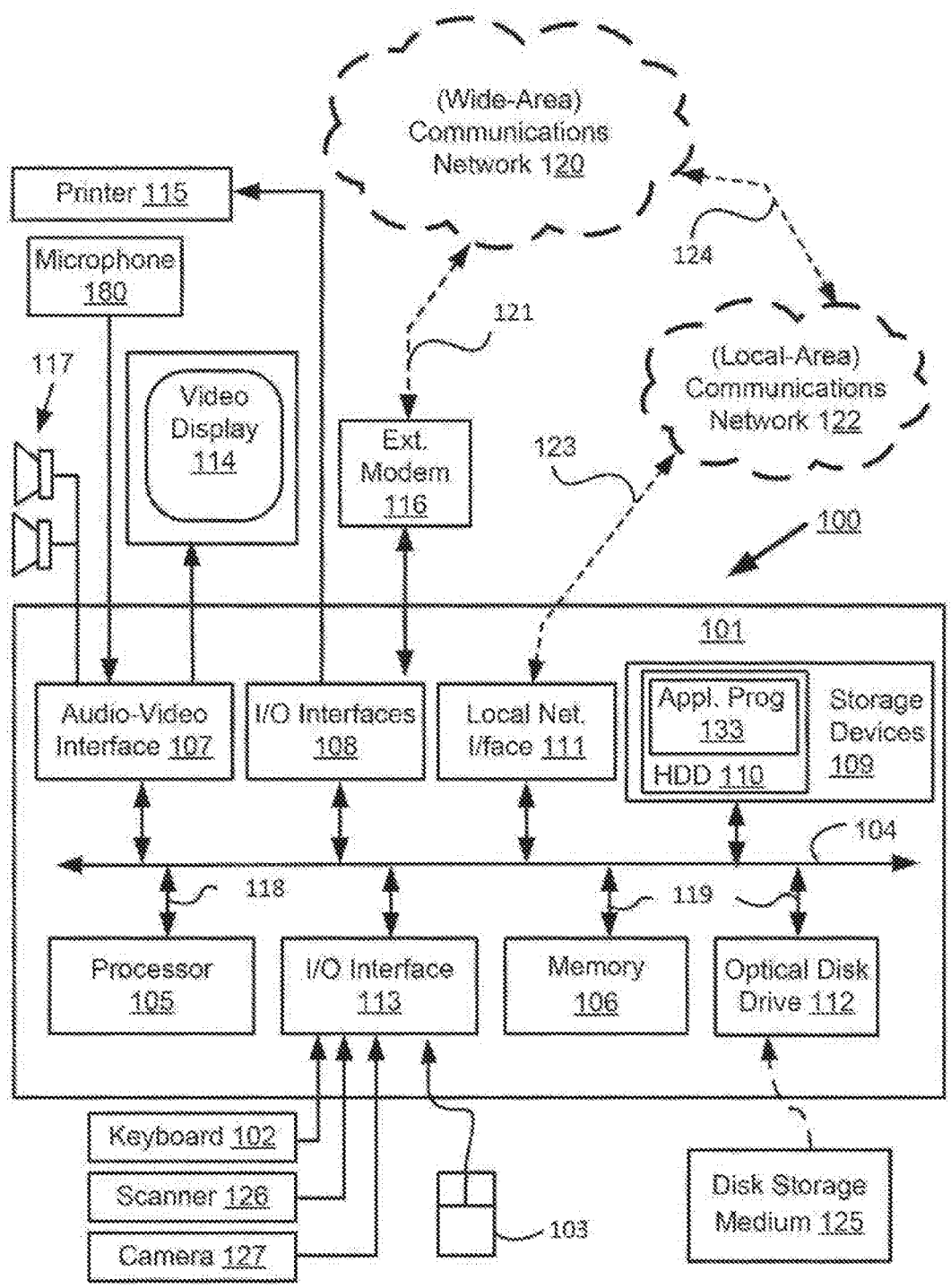
FIGS. 1A and 1B form a schematic block diagram of a general purpose computer system upon which arrangements described can be practiced.

This disclosure describes methods and systems for combining electronic hand writing detection systems and methods with web conferencing type systems and methods. The methods and systems disclosed demonstrate the creation of a cloud based collaboration platform with the integration of a digital ink pen into the platform that allows for real-time collaboration, and the exchange of ideas through online remote meetings while users can still use traditional ink and paper (or any other suitable writing medium and surface). The systems and method described allow users to collaborate and interact using their own handwriting. The systems and methods described allow each user to have their own workspace accessible only to them, or to other users that they may select. The systems and methods described allow users to collaborate with one or more other users of the system, such as users that are attending the same meeting space (such as a lecture or classroom, for example). One or more of the users may provide instant feedback to one or more of the other users. The collaboration may be 1 to 1, 1 to many, few to many or many to many. The systems and methods described provide the ability to transmit and record the interactions of two or more users together in a shared workspace and to provide those interactions in a real time manner via a live dashboard. Further, various systems and methods are disclosed for tracking writing actions using a camera. These tracking systems and methods may be incorporated into the other systems and methods described herein. The systems and methods described also provide other key features and advantages as described herein.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Figure 1B:
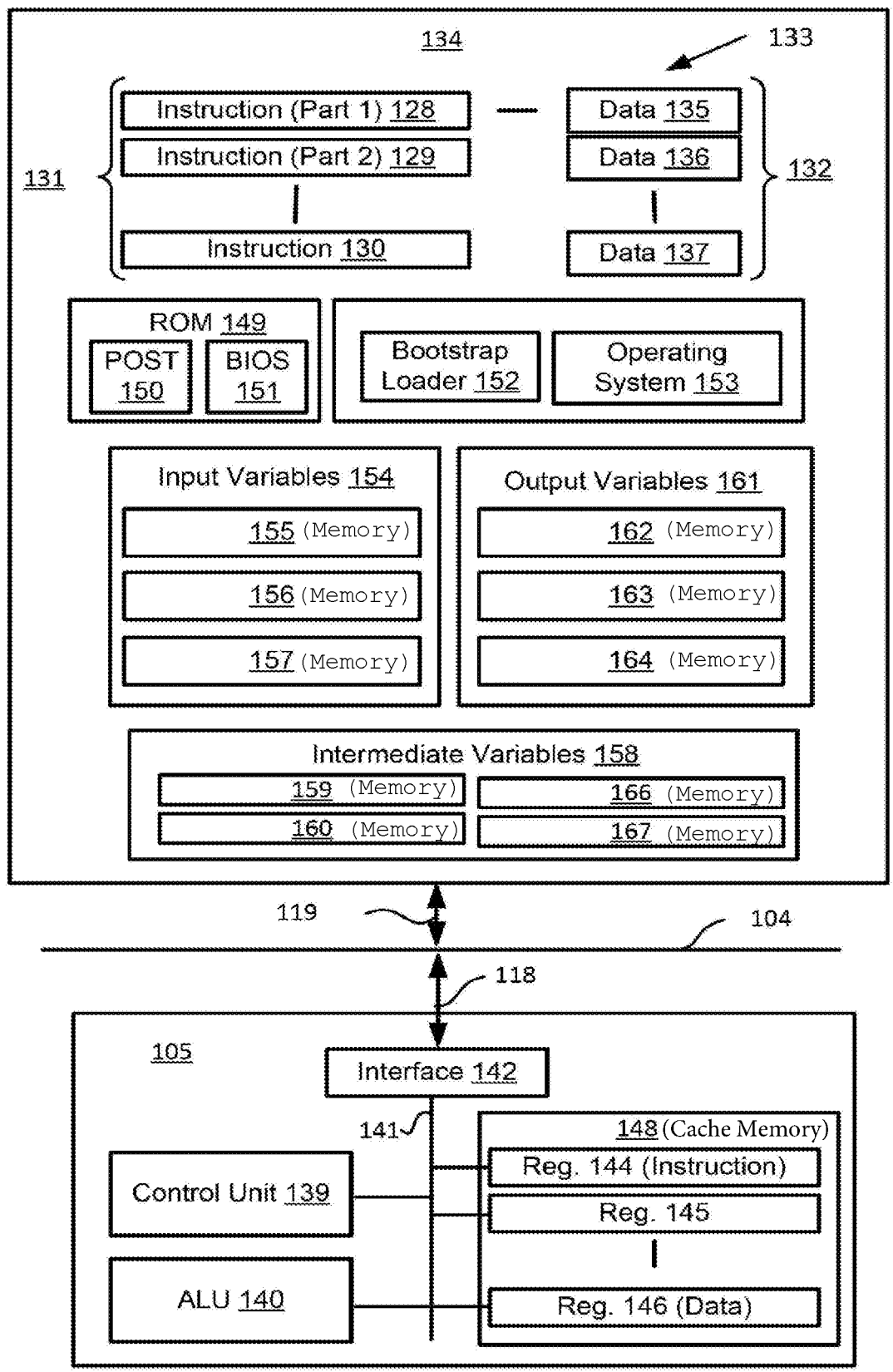

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 121 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated), or a projector; and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Figure 5:
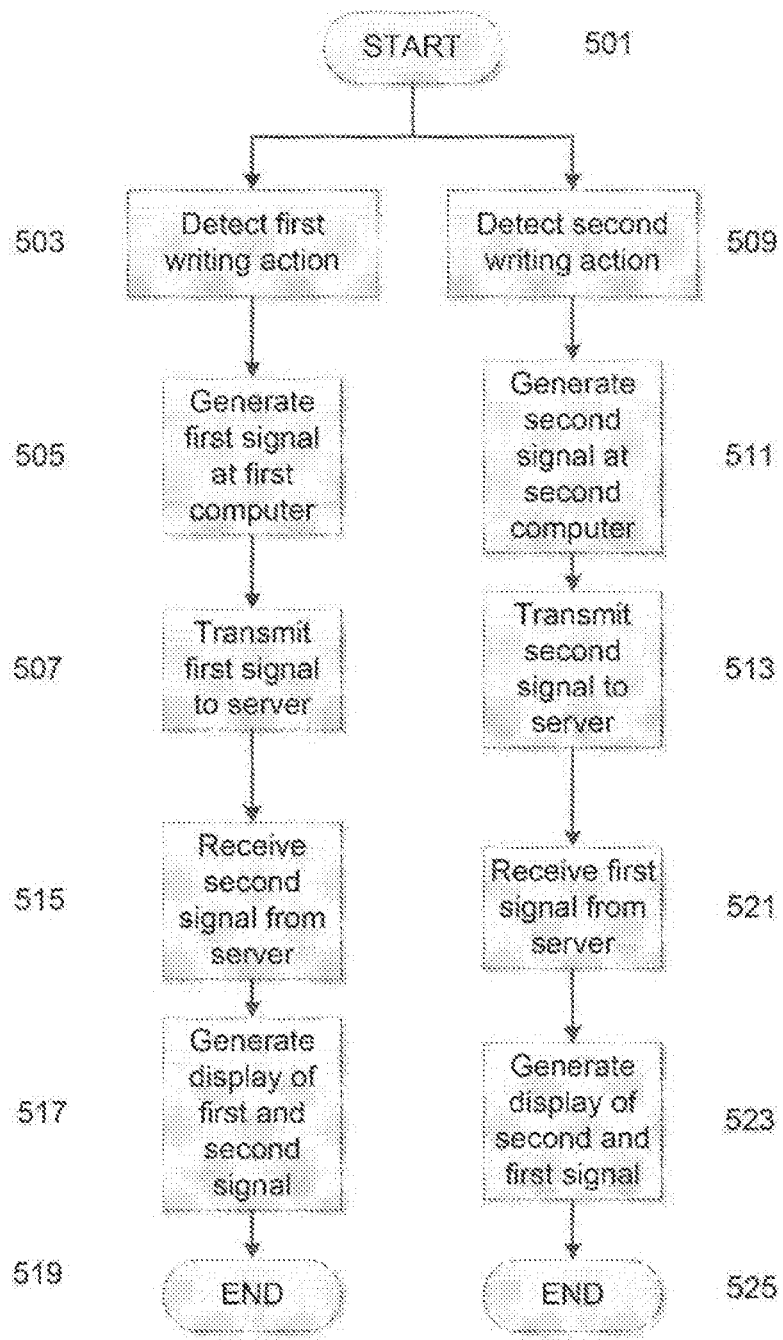
FIG. 5 shows a process flow diagram according to this disclosure.
Figure 6:
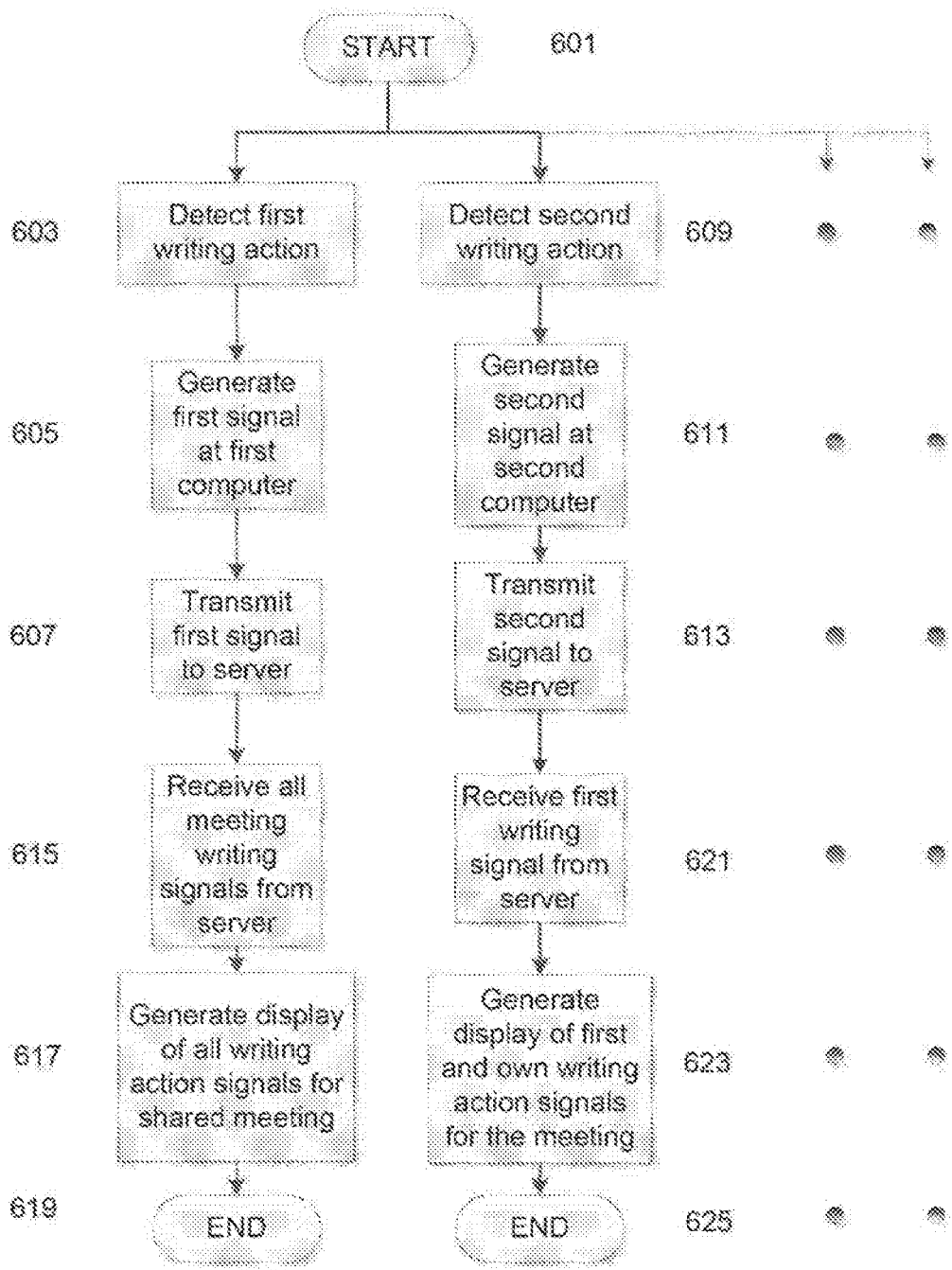
FIG. 6 shows a process flow diagram according to this disclosure.
Figure 8:
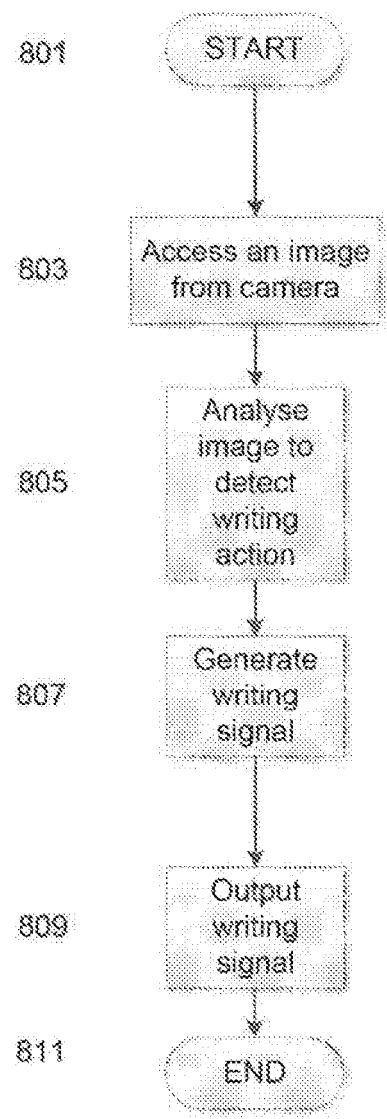
FIG. 8 shows a process flow diagram according to this disclosure.

The methods as described herein may be implemented using the computer system 100 wherein the processes of FIGS. 5, 6 and 8, to be described, may be implemented as one or more software application programs 133 executable within the computer system 100. In particular, the steps of the methods described herein are effected by instructions 131 (see FIG. 1B) in the software 133 that are carried out within the computer system 100. The software instructions 131 may be formed as one or more code modules, each for performing one or more particular tasks.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for detecting and/or sharing writing actions.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for detecting and/or sharing writing actions.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed writing detection and sharing arrangements use input variables 154, which are stored in the memory 134 in corresponding memory locations 155, 156, 157. The writing detection and sharing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 5, 6 and 8 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The methods described herein may alternatively be implemented in dedicated hardware such as one or more integrated circuits performing the functions or sub functions of the writing detection and sharing methods. Such dedicated hardware may include graphic processors, digital signal processors, or one or more microprocessors and associated memories.

Figure 2A:
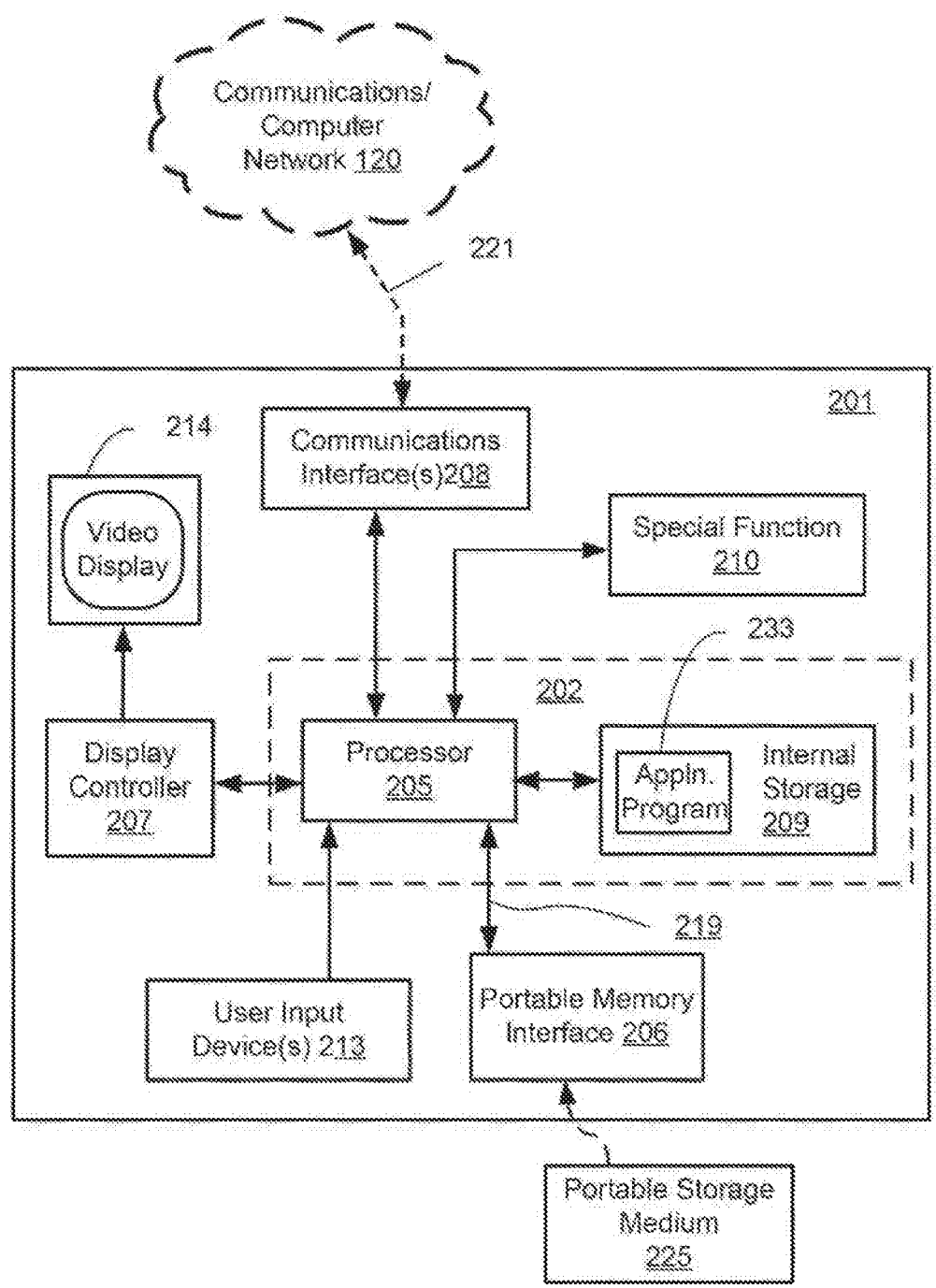
FIGS. 2A and 2B collectively form a schematic block diagram representation of an electronic device upon which described arrangements can be practised.
Figure 2B:
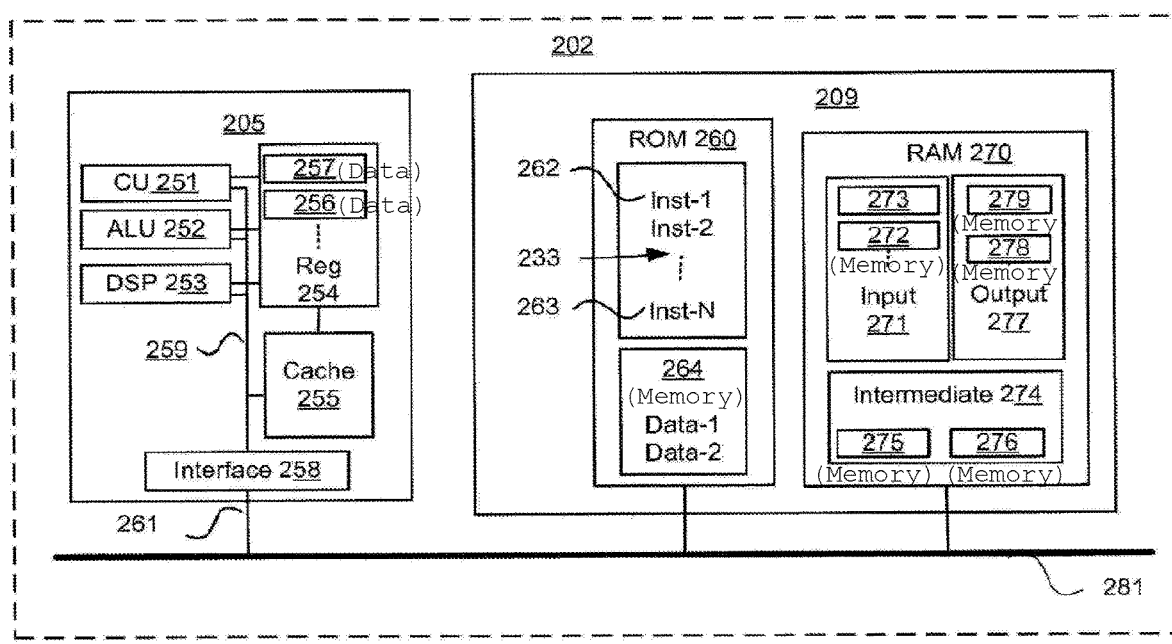

FIGS. 2A and 2B collectively form a schematic block diagram of a general purpose electronic device 201 including embedded components, upon which the writing detection and/or sharing methods to be described are desirably practiced. The electronic device 201 may be, for example, a mobile phone, a portable media player, virtual reality glasses or a digital camera, in which processing resources are limited. Nevertheless, the methods to be described may also be performed on higher-level devices such as desktop computers, server computers, and other such devices with significantly larger processing resources.

As seen in FIG. 2A, the electronic device 201 comprises an embedded controller 202. Accordingly, the electronic device 201 may be referred to as an "embedded device." In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

The electronic device 201 includes a display controller 207, which is connected to a video display 214, such as a liquid crystal display (LCD) panel or the like. The display controller 207 is configured for displaying graphical images on the video display 214 in accordance with instructions received from the embedded controller 202, to which the display controller 207 is connected.

The electronic device 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 201 is configured to perform some special function. The embedded controller 202, possibly in conjunction with further special function components 210, is provided to perform that special function. For example, where the device 201 is a digital camera, the components 210 may represent a lens, focus control and image sensor of the camera. The special function component 210 is connected to the embedded controller 202. As another example, the device 201 may be a mobile telephone handset. In this instance, the components 210 may represent those components required for communications in a cellular telephone environment. Where the device 201 is a portable device, the special function components 210 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 202, where the processes of FIGS. 5, 6 and 8 may be implemented as one or more software application programs 233 executable within the embedded controller 202. The electronic device 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 2A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 233 and the corresponding code modules mentioned above may be executed to implement one or more graphical user interfaces (GUIs) to be rendered or otherwise represented upon the display 214 of FIG. 2A. Through manipulation of the user input device 213 (e.g., the keypad), a user of the device 201 and the application programs 233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processor (DSP) 2153 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 though 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the electronic device 201.

The execution of a set of the instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the electronic device 201.

The herein described systems and methods fill the current gaps in traditional and virtual collaborations. According to one example, in classrooms only the teacher can create notes, present and record the entire session. According to one example, an in-person lesson may be replicated using the herein described highly interactive application. This system and method can solve the time spent on attempting to communicate paradigms using dated web conferencing tools. Students and the teacher can intuitively create and share their own materials utilising new ways of writing and drawing. The teacher can easily access students' activities and provide instant feedback. At the end, all the participants can archive their own personalized recorded videos of their works on their device.

According to one example, the herein described system and methods may provide a new and innovative technology (as well as build on existing technologies developed) to provide an online marketplace providing high quality online group learning via a real-time educational platform. This provides the capability of creating an online group environment as close as possible to face-to-face group collaborations (such as classrooms or the like).

It will be understood that the system may be used in environments other than teaching environments. Indeed, the system can be used in any environment where collaboration is required between two or more users.

In general, the herein described system includes a group based collaboration platform combining hardware and software elements to allow for next level collaboration. According to one particular example, the system is a learning tool.

Desktop Application

This works across several operating systems (Mac, Windows and Linux) and can be integrated into existing Learning Management Systems.

Digital Ink Pen

The hardware components of the pen system include a base unit and a digital ink pen that connects via Bluetooth to a user's computer and the disclosed desktop application. A special driver has been developed for the base unit to enable transfer of the writing signals to the desktop application using Bluetooth. IR (Infra-Red) readers capture the handwriting on paper and transmit the writing signals to the screen simultaneously.

Group Meetings

Users can connect to a host-meeting remotely via a desktop application. Meetings can be set up amongst users of the system through a web based scheduling application. Once meetings are scheduled, the users are notified via email and can log into the system with their credentials to attend a meeting. Users can join at any time, as long as the meeting is live.

Virtual Notepad

The platform allows teachers and students, for example, to intuitively create their own material by writing and drawing on their own notepad, with the base unit attached to it. It also allows them to share those notes and drawings in real-time, and remotely. In addition to that, they can create pages on screen and share those instantly.

Delivers a Personal Recording

The system provides all users with the ability to record their own notes and the general meeting conversations. All these are saved in the cloud on the server and the system provides users with the ability to access the notes and conversations on-demand.

According to one example, the system emulates a physical classroom. A teacher has the ability to write exercises for the class on a shared notepad. The teacher may then monitor the progress of the students via a live dashboard accessible via the teacher's computing device. The teacher's dashboard on the teacher's computer will show each of the students' live virtual notepad. The teacher may see the status of each worksheet of each student by zooming in on each page. The system provides teachers with the ability to put students' work side by side for comparison.

The system and method may also provide instant feedback. For example, the system enables students to "put their hands up" to speak, just like in a standard classroom. The teacher can may either communicate to the student's desktop via pre-populated messages or send them a personalised message. The teacher may also use the system to notify a student that they are busy with someone else in class by putting up a virtual sign that can be viewed from the student's desktop.

The system and method allows for real-time collaboration. Users may allow several people to speak and write at the same time on the same virtual notepad, using a pen and paper.

Students may also instantly chat to their teacher. The system enables a teacher to either chat to individuals or a group.

The integrated voice conferencing in the application may be used to discuss topics. The host can allow students to speak one at a time. All voice conferencing can be recorded.

The host may control permissions to allow users to share notes, speak one at a time or even illustrate their notes.

All users, including the host, may share their notes with anyone in the meeting. They can also duplicate their handwriting for the purpose of annotation and editing.

All users may create their own unlimited number of pages that can also be shared with everyone (or a selected few) in the meeting.

All notes, including PDFs can be edited and annotated using the system. Users can use the on screen tools to highlight text and mark documents and notes.

All users may save their notes and handwriting as PDFs, or they may open multiple PDF documents for viewing and editing within the desktop application. All notes and PDFs may also be saved as one document. Further, notes may be shared via the server with other users.

Users may also use a mouse instead of the digital pen, to make notes and annotate documents. The application pen may allow the user to switch between different brushes, thicknesses and colours.

Figure 3A:
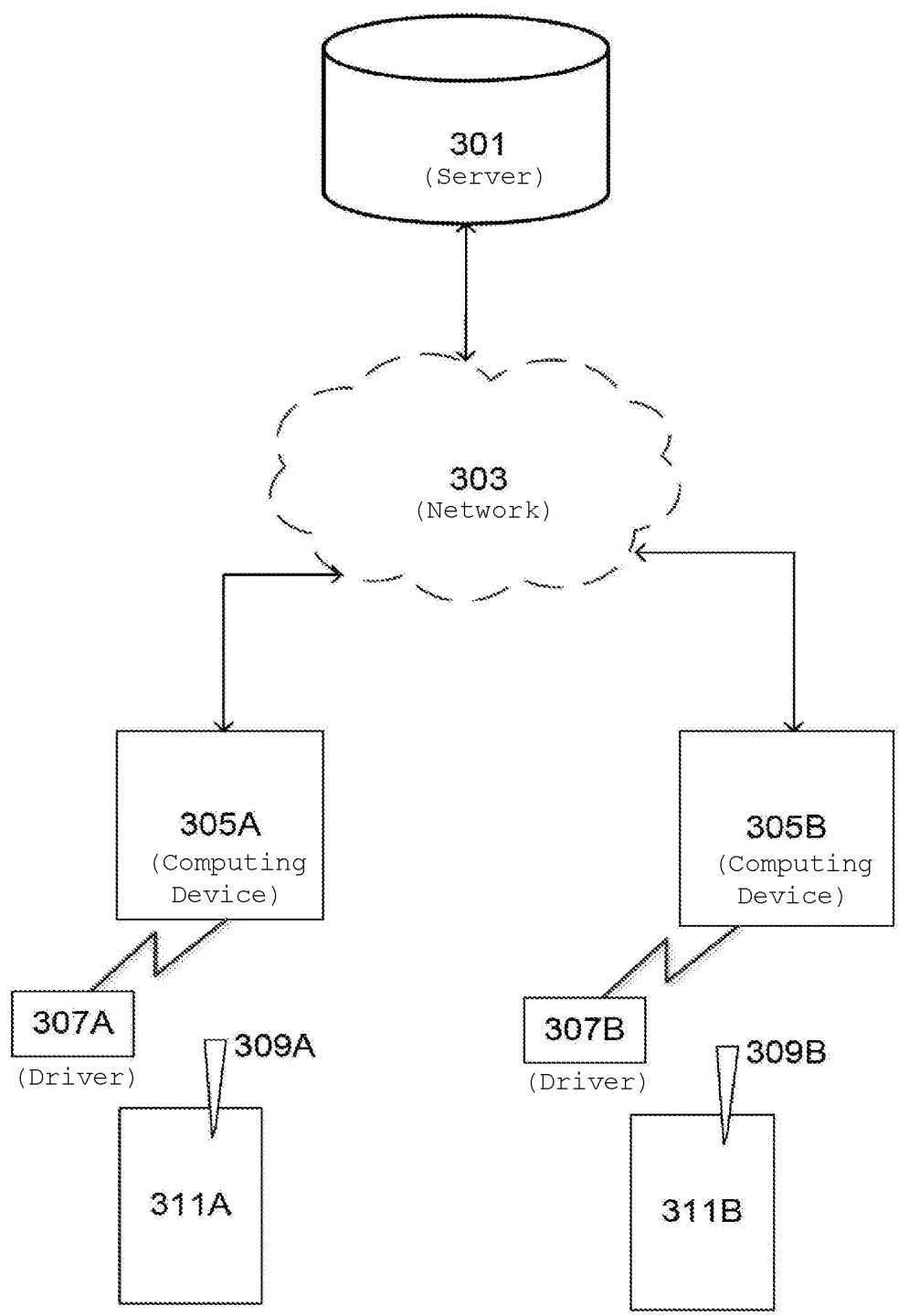
FIG. 3A shows a system block diagram according to this disclosure.

FIG. 3A shows a system block diagram according to an embodiment of the present invention. A server 301 is provided which performs methods described herein. The server may be a computing device as described with reference to FIGS. 1A and 1B. The server is connected to a network 303. The network 303 may be the internet, for example. Alternatively, the network may be any other suitable network.

A first computing device 305A is also connected to the network 303. Again, the first computing device 305A may be a computing device as described with reference to FIGS. 1A and 1B.

A second computing device 305B is also connected to the network 303. Again, the second computing device may be a computing device as described above with reference to FIGS. 1A and 1B.

The first and second computing devices may be remote from each other.

According to one example, the first computing device may be operated by a teacher or a student. The second computing device may also be operated by a teacher or a student. Alternatively, it will be understood that the computing devices may be operated by any other suitable entity. The system described with reference to FIG. 3A shows a one-one relationship to enable one person to collaborate with another person. The first and second computing devices (305A and 305B) are connected via a Bluetooth connection to a driver of a pen detection system. That is, the first computing device 305A is connected via a Bluetooth connection to an electronic pen driver 307A. The second computing device 305B is connected via a Bluetooth connection to a pen driver 307B. The electronic pen driver 307A emits infrared signals to detect the movement of an electronic pen 309A. The electronic pen driver 307B emits infrared signals to an electronic pen 309B. Each of the electronic pen drivers (307A, 307B) detects the movement of the pens (309A, 309B) to enable the detection of physical writing actions on a physical medium. That is, the electronic pen 309A is used to write words, symbols or images onto a physical medium 311A. That is, the physical medium 311A is a physical writing surface upon which a physical writing action may be performed. For example, the physical medium 311A may be a piece of paper or the like. Accordingly, the physical medium 311B may also be a piece of paper.

According to this example, an electronic pen driver communicates with the electronic pen via a standard infrared process. However, according to the herein disclosure, the driver between the electronic pen driver 307A and the computing device 305A has been updated to enable Bluetooth connections to be made.

The same type of Bluetooth connection has also been enabled on the electronic pen driver 307B.

As an alternative, one or more of the electronic pen systems may be replaced with a camera system as described herein.

As will be explained in more detail below, the herein described system and method enables a meeting to be setup via a desktop application running on each of the first and second computing devices (305A and 305B). The meeting is controlled by the server 301. That is, upon joining the meeting at each of the first and second computing devices, the server is arranged to share physical writing actions that are performed by each of the electronic pen systems. That is, the desktop applications running on the first and second computing devices in association with the electronic pen systems are arranged to detect for a particular meeting one or more physical writing actions that are being performed on physical writing surfaces. Writing signals are generated at the first and second computing devices via the pen systems. The writing signals generated at the first computing device are forwarded to the server 301 via the network 303. Further, the writing signals generated at the second computing device 305B are also forwarded to the server 301 by the network 303.

The server then forwards these writing signals to the other computing device. That is, the server 301 forwards the writing signals received from the first computing device 305A to the second computing device 305B. Further, the server 301 forward the writing signals generated at the second computing device 305B to the first computing device 305A. Therefore, the writing signals are forwarded by the server for receipt at each of the computing devices associated with the meeting. However, it will be understood that the server may forward all of the generated writing signals to all of the computing devices. Alternatively, the server may be arranged to forward only the writing signals generated by other computing devices to a particular computing device.

The first computing device may then output a representation of the physical writing actions. For example, the output may be in the form of a display on a connected screen. Alternatively, the output may be any other suitable output such as storing the received signals and the internally generated signals into an internal or external memory. Alternatively, the output may be in the form of forwarding the generated writing signals to a printer. Other suitable outputs are also envisaged.

It will be understood that the first computing device may output a representation of the physical writing action generated at the second computing device based on the received writing signals from the server 301. Further, the representation of the physical writing actions also show the actions performed by the electronic pen system connected to the first computing device. That is, the writing actions of both of the first and second pen systems are represented or output at the computing devices (305A and 305).

Figure 3B:
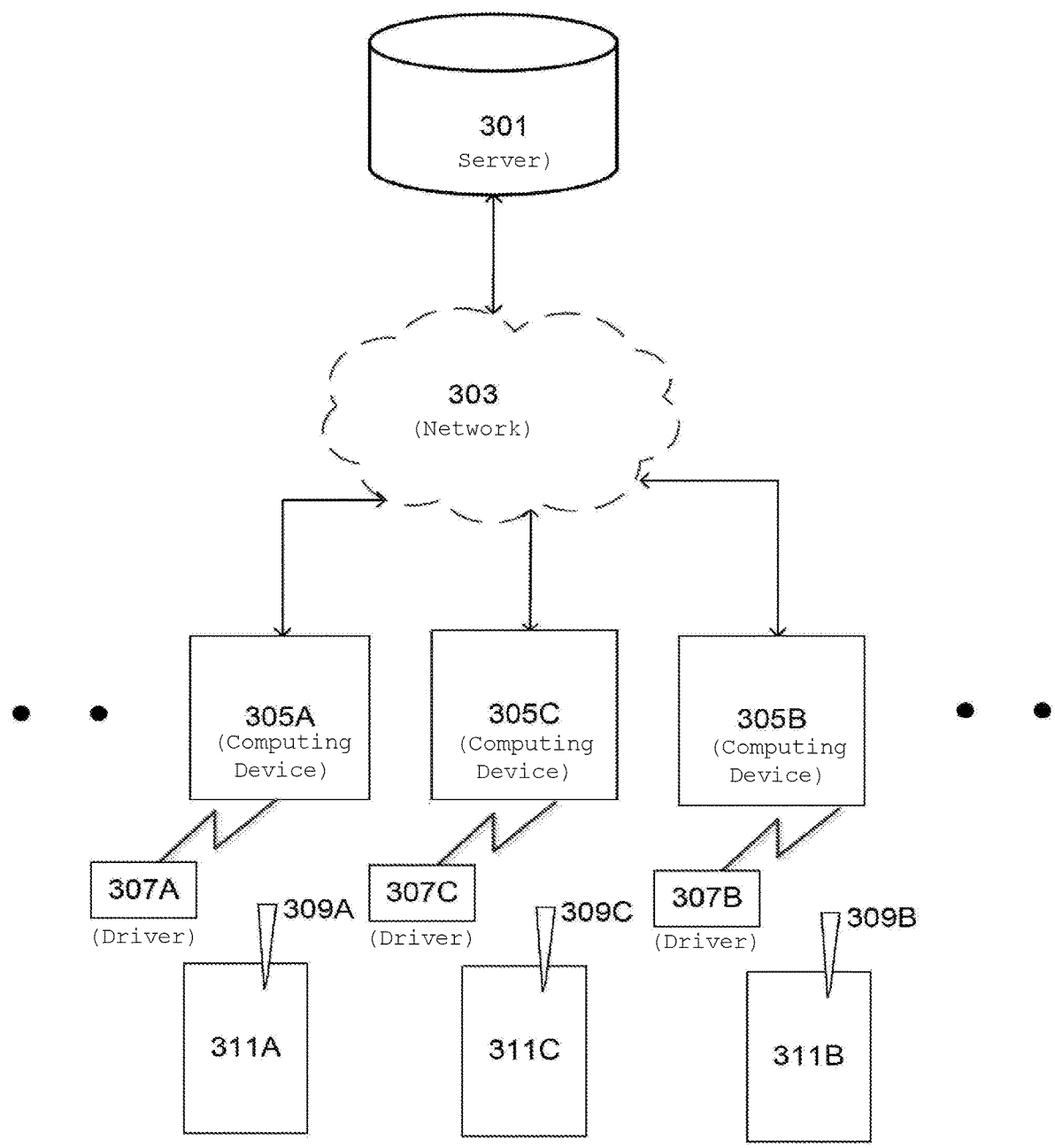
FIG. 3B shows a system block diagram according to this disclosure.

FIG. 3B shows a system block diagram according to an alternative example. As shown in FIG. 3B, the server 301 is still connected to the network 303 as described above in relationship to FIG. 3A. Further, the first and second computing devices are also still connected to the network and the server 301. In addition however, further computing devices 305C and others (represented by the dots) may also be connected to the server via the network 303.

Each of the computing devices may be remote from each other.

Figure 4A:
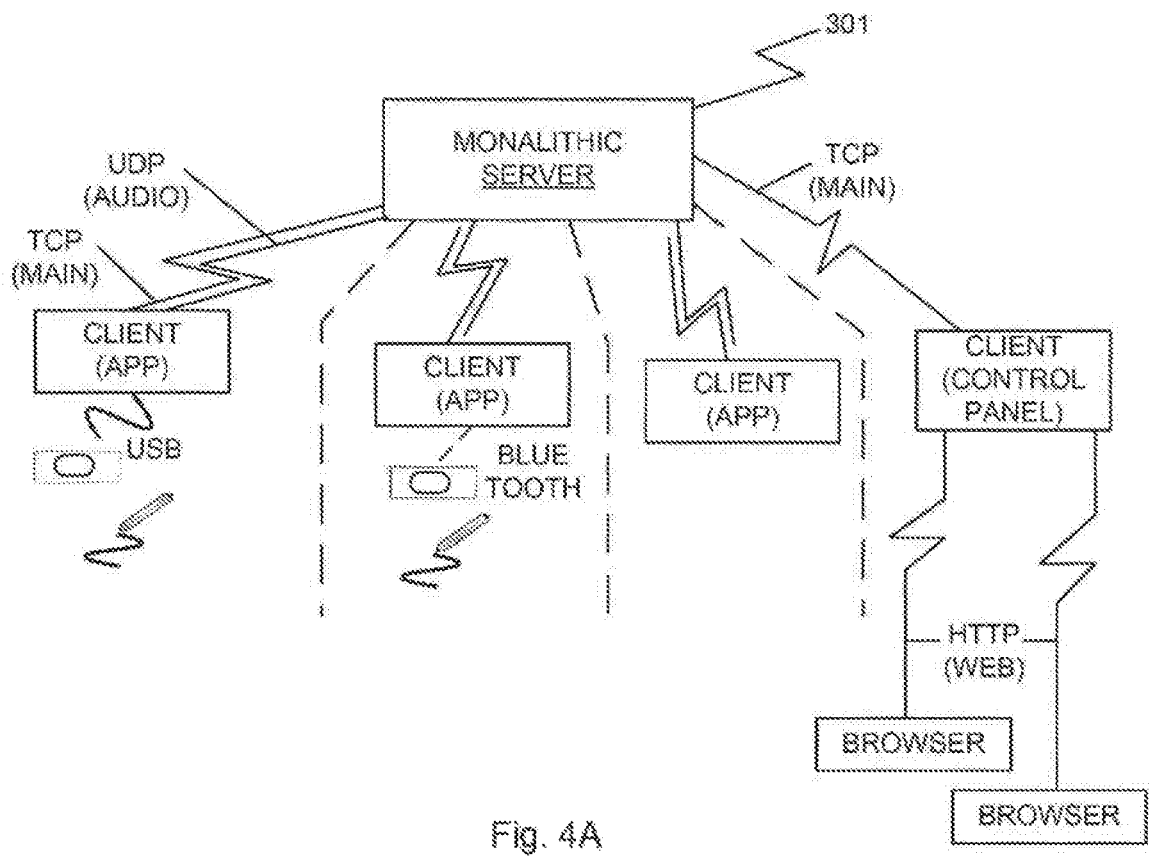
FIG. 4A shows a system block diagram according to this disclosure.
Figure 4B:
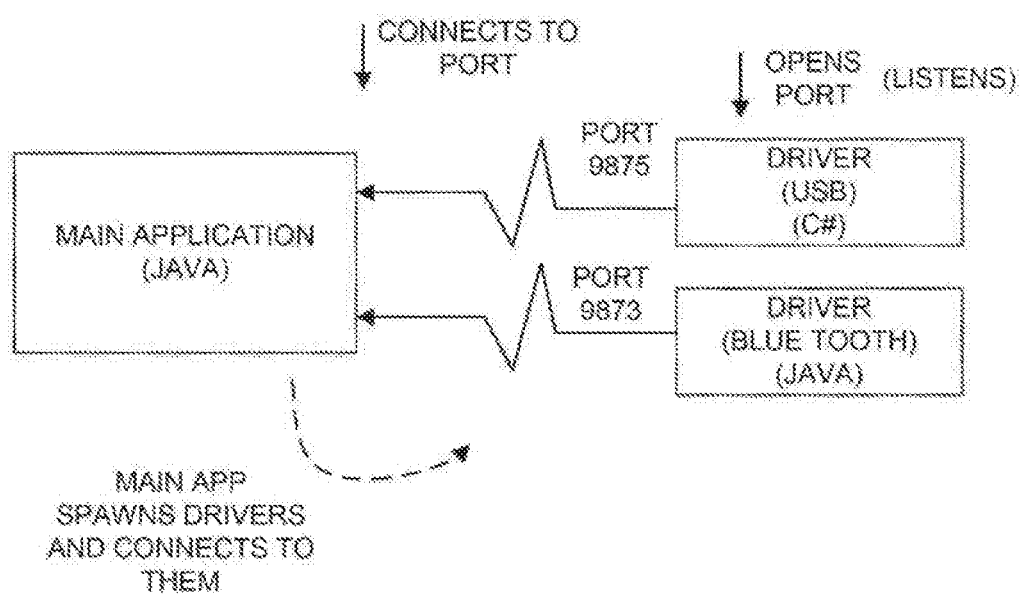
FIG. 4B shows a server-client block diagram according to this disclosure.

In this scenario, it can be seen that a connection may be made from one computing device to many other computing devices. Further, it will be understood that a few computing devices may be connected to many other computing devices. Further, it will be understood that many computing devices may be connected to many other computing devices. For example, in this scenario, a first computing device may be operated by a teacher in a teaching establishment. Other computing devices, being two or more computing devices may be operated by students of that same teaching establishment. Therefore, the first computing device 305A may the host of a meeting (e.g., a lesson) that may be followed by the other computing devices connected to that same meeting. FIGS. 4A and 4B show a system block diagram according to the herein described example.

As an alternative, one or more of the electronic pen systems may be replaced with a camera system as described herein.

A high level overview of the system and process is now described.

According to this particular description, the system is described in the context of an education-orientated, real-time online collaboration application. It will be understood that the system may be used in other environments besides education.

According to this example, the system is designed to make online tutoring lessons easier. In particular, this is well suited for interactive and visual lessons such as Maths and Science tutoring, where hand-written notes are necessary for proper communication.

The system is designed to be an 'all-in-one' application for a lesson, i.e. the only application required for the lesson. Therefore it provides many other features such as audio communication, text chat functionality and permission & administration capabilities for tutors.

A list of some of the features the system provides include:
Networked & shared virtual 'pads' that multiple users see exactly the same way, and can draw on and/or edit together.
Support for drawing on real paper and virtual pads using a digital pen system. Alternatively, a digital writing system using a camera may also be utilized.
The ability to communicate using text chat, audio & video chat (if a microphone is available) and basic 'raise hand/attention' notifications.
The ability to save & load PDF documents, which are all fully networked.
The ability to download meeting recordings and play them back as if the user was in the meeting again.
Tutors or faculty staff can manage, plan, book and archive meetings using a web control panel.
A fully functioning plugin system on both client and server, that may provide integration with other learning software.
Integration with learning management software (LMS) e.g. Moodle, to provide user accounts, permissions and automatic meeting booking.
These features also include:
Emulation of a physical classroom.
A monitoring dashboard.
A highly intuitive & interactive whiteboard.
Instant feedback.
Real-time collaboration.
Instant chat.
The ability to share handwriting that is physically performed on paper.
Voice and/or video conferencing.
Host permissions.
Multiple attendees.
Personal recordings.
Bluetooth or USB Connection to the electronic pen system.
Attendees page creation.
Creation of own personalized recordings.

In-page editing & annotation.
PDF file management.
Notes sharing.
Multiple page interaction.
Side by side view & interaction.

The software of the system may be written in any suitable language. In particular, in this example, the software used was mainly Java. Other components, such as drivers, web panel software and deployment tools (e.g. installers) were developed in a variety of other languages which were mostly C based.

High Level Architecture (Network)

At its core, there are only two 'logical' elements to the system architecture: the server and the client. The server manages meetings, handles all connections, passes messages between clients, etc. The client, which connects to the server, makes requests, joins meetings, sends drawings (via the server) etc.

According to on example, there are 3 core elements: the server, the desktop application and the control panel. Technically, the control panel is also a client (and is based off the same network client module as the desktop application. See below for more details).

Client-server communication occurs over a TCP connection. A specific protocol has been developed for structuring messages, basic logic and some constants, called Steeves Protocol.

For the desktop application, there is also another connection over UDP that handles audio communication. There is a separate protocol for this, called Velvet Protocol. The audio connection is optional and entirely separate from the master TCP connection. The control panel does not make this audio connection On the desktop application, there are the hardware/driver communications. Drivers for 3rd party hardware are provided as entirely separate applications that run in separate processes to the main application. They communicate with the main application using a very basic network protocol that operates only on the local machine. Communication is over TCP. There are designated ports for each driver that the driver opens and the application connects to. Communication is only one-way. Drivers simply send the state of all pens connected to them constantly, and the application extrapolates active pens and filters out useless/redundant messages.

The electronic pen systems use triangulation methods to determine the location of the writing tip.

Module Overview

FIGS. 4A and 4B show various modules that are part of the software suite. FIG. 4A shows the clients and client control panel connected to the server. FIG. 4B shows the desktop connected to the electronic pen systems.

Modules

VMCLASS Server This is the main server module. It is a standalone Java application. Network IO is built off the VMCLASS project. The server is monolithic: It manages all meetings and handles all connections. TCP (main) connections begin in SteevesProtocolAdapter.java. UDP (audio) connections begin in VelvetProtocolAdapter.java. The actual application starts in VmclassServer.java Steeves Protocol This module contains objects and basic logic shared between client and server for the main TCP network protocol. Every object that is sent over the wire is a basic Java bean object. Messages are serialised into JSON objects.

Velvet Protocol This module contains objects and basic logic shared between client and server for the audio UDP network protocol. Every object that is sent over the wire is manually serialised and de-serialised. Objects are classified by their length.

Driver Protocol This module contains objects and basic logic shared between drivers and the application that connects to them.

VMCLASS Client Contains connection logic for the client only. Network IO is built off the VMCLASS project. VMCLASS Client provides simple functions for calling RPCs (Remote Procedure Calls) on the server and getting the result. An RPC effectively sends instructions to the server to enable the server to perform a process. If an exception is thrown on the server while processing a request it will be re-thrown on the client, on whatever called the function. Also provides listeners for events (unsolicited messages from the server).

Velvet Client Similar to VMCLASS client, for audio. Network IO is built off the VMCLASS project. Also contains recording functionality (directly connecting to the microphone and processing audio), encoding/decoding functionality and mixing/playback functionality.

Email/Simple/Moodle user providers (Java Eclipse Project) These are plugins that authenticate users through various methods and decides permissions for them (tutor/student). Email User Provider is for adding meeting participants by their email address (and letting them login with their email address). Simple User Provider loads users, passwords and permissions from a flat configuration file (the main server config file, prop.properties). Moodle User Provider connects to a moodle server over HTTP to authenticate users and get their permissions. Both the Moodle and Email plugins run on both control panel and server. The Simple user provider runs on the server only Zigma Control Panel This is the control panel client, written as a servlet. Though possible to run on other servlet engines, it is designed to be ran on the server. It serves the control panel pages and manages client connections to the server. It performs actions such as deleting, creating and managing meetings on the browser's behalf.

New Jarna This module is effectively the desktop application. It contains all the UI code, rendering drawings, managing the desktop application connection, managing playback recordings, as well as other functions.

Driver Manager This module spawns separate driver processes depending on the current platform (see High Level Architecture) and connects to them. It passes messages from the individual drivers to the main application so they can eventually be rendered.

Driver USB Win This is the USB driver that only runs on Windows computers. There are actually two projects to this module: The Java loader, under DriverUSBWin (which saves the native exe file in a temporary folder and loads it) and the actual native application, written in C# and found under UsbPenSupport (which connects to the pen and forwards events over the network connection to the Driver Manager)

Driver BT Mac OSX Lin This single module connects to pen hardware over Bluetooth. It is built off the Bluecove library to handle the Bluetooth connections. It interprets the raw byte stream from the Bluetooth receiver, turns them into events and forwards said events over the network connection to the Driver Manager.

Installer This contains a number of various scripts, setups and tools to build the application for its various desktop target platforms. (See Build Process)

Steeves Protocol Walk-though

This section explains the life of a typical TCP connection using Steeves Protocol. At its core, Steeves protocol is broken up into two main systems; the RPC system and the event system (built off the RPC system). When used together, they handle everything networked in the system, except audio. Meeting updates, drawings, login information etc. are all handled over Steeves Protocol. According to this example, every message in Steeves Protocol is a Java Bean. These Beans are serialised as JSON strings, and these strings are sent over a TCP stream, separated by newlines. When receiving, each end server or client) first tries de-serialising the given message, and then processes it.

The two main network 'entry points' for Steeves protocol is SteevesProtocolAdapter (for server) and VMCLASSClient (for client). Messages first appear here on both ends. It is important to note that if an unhanded exception is thrown in any VMCLASS handling thread, the connection is immediately terminated.

It should be noted that there are two handlers on each side of the protocol. On the client side, a message always goes through SteevesClient & VmclassClient, and on the server side messages always go through SteevesProtocolAdapter before being handled by ProtocolHandler. This separation is on purpose. That is, there are two levels to handling a message, one level simply parses the message, the other applies state and other information to draw meaning from a message. A similar structure can be seen in the Velvet audio protocol structure.

RPCs

As mentioned above, at the core of SteevesProtocol is the RPC system. Everything is considered an RPC. There is a base message bean (RequestMessage) that is sent to the server that contains the function to call and it's parameters, and a response (RequestResponse) that contains the return value of the call, or an exception (if an exception occurred). If there is an exception, it is re-thrown on the client. It is also important to note that during an RPC, the calling method blocks on the client until the server replies. If the request times out, a TimeoutException is thrown.

On the server, there are actually two higher level handlers (for different levels of message handling, see above). If a message is detected to have come from a plugin, it will be sent to the plugin RPC handler, an IRPCMessageHandler. If not, it will be sent to the default message handler, ProtocolHandler.

First, the main application makes a call to the SteevesAdapter, for example to authenticate with a username and password. The adapter first makes sure it is connected to the server through its VMCLASSClient (if it can't connect it will throw an exception). The SteevesAdapter then prepares a message bean to send to the server, fills it, and passes it onto the VMCLASSClient to send (and block until it receives a response). The VMCLASSClient then writes the message (complete and in order) and a newline to the server over the VMCLASS TCP connection.

On the server side, the message is first received by the SteevesProtocolAdapter, which de-serialises the message back into a bean. It then decides whether to send it to the plugin RPC handler for processing or the main protocol handler. If the message is bound for the main protocol handler, the SteevesProtocolAdapter then extracts the function name and parameter from the bean, and calls the function specified in the ProtocolHandler. It then expects a ResponseMessage object to be returned, which it can write back to the client. If an exception is thrown while waiting for it, the Adapter will fill its own ResponseMessage with the exception and write it back. If not, then it will simply write the ResponseMessage it got back to the client.

The client does a similar thing to the response message once received. It immediately attempts to parse it, and if that fails closes the connection. The response is matched to the request, and the calling function thread continues execution with the right result. If an exception was returned then the exception will be re-thrown in the calling function's thread.

Events

Events are built off the RPC system. An event may be considered at least a portion of a physical writing action that has been recorded. It is best to think of an event as an 'unsolicited' RPC. They are response objects without a request, or a request object without expecting a response. The server handles received events like it would most messages. The client has a listener-publisher pattern for dealing with received events.

There is only basic handling logic on the server side of event processing. That is, the server simply verifies the user has permission to send that event type, then forwards the event to every other user that is associated with the meeting.

From client to server, the method is extremely similar to sending RPCs, except the event itself is wrapped up in another bean called a MeetingEvent and sent to a constant handling function (updateMeetingChannel) on the server's ProtocolHandler. The calling client thread does not block like it does for RPCs.

From server to client something a little different happens. The server fills the response method name with an event prefix then the event name, and passes the event object as the parameter. For example, if the server wanted to send a ViewingPageEvent event it would set the method name to "event+ViewingPageEvent". The client checks for this "event+" prefix, and if it finds it when processing a message from the server, forwards the object to the main application for processing instead of treating it like an RPC response.

Velvet Protocol Walk-through

Velvet is the name given to the system's audio transmission protocol. The protocol and logic is built of UDP. It has its own implementation for pinging, clock alignment, retransmission, missing packet resolution, packet reordering etc.

Clients are authenticated via an integer 'token' that they collect from the MeetingParticipant object sent over the Steeves Protocol connection. The tokens are random and unique for each user in a meeting on the server. If a user is already connected when another joins, the new user may have their connection denied.

The following describes the steps a request (authentication) and audio messages take throughout the entire system, both on the client and server.

Joining an Audio Meeting

In order to connect to an 'audio meeting', first the main application creates a VelvetClient object that will handle all networking on its end. It also creates an AudioRecorder for collecting audio from the microphone. After the main application receives its audio token from the server, it will initiate a connection by calling connect( ) in the VelvetClient object.

The client then creates a handshake packet (class: AuthRequest) and fills it with various connection parameters and other connection information (such as system time for clock alignment, etc.). It then calls write( ) in VMCLASS to send the message to the server.

Once the packet is received on the server, the server immediately attempts to parse the message in the VelvetProtocolAdapter. The VelvetProtocolAdapter is a parser, sending and receiving messages in a dumb, stateless way.

Management of almost everything audio related happens in the AudioManager. Once the message is parsed, it is sent to the AudioManager for processing. The AudioManager looks up the token and matches it with a Meeting and MeetingParticipant object. If not done already, the AudioManager will create an AudioMeeting and AudioConnection for the connection. For every meeting the server is handling, there should be an AudioMeeting that handles audio. For every audio connection the server is handling, there should be an AudioConnection object that handles sending, receiving and buffering of audio on the server. The AudioManager then prepares a response and writes it directly to the client. If the VelvetClient receives a success message, it will begin processing its buffer of audio and begin sending audio to the server.

Life of an Audio Message

The life or process of an audio message from client to server and back again is as follows. At multiple stages, packets are 'put away' or stored in a buffer for a certain amount of time, and then collected by another thread upon which processing continues.

Audio is first collected from the microphone in the AudioCapture class. The main application then encodes and wraps the audio in a VoiceMessage packet and sends it to the VelvetClient via offerVoiceMessage( ). The client then puts the message in the toSend queue and returns the current thread. The VelvetClient has a thread running that waits for messages in the toSend queue. It receives the message some time later and writes it over the network.

The server initially receives the VoiceMessage in the VelvetProtocolAdapter, the main network entry point for audio in the server. The VelvetProtocolAdapter quickly attempts to parse the message, and if successful passes it straight onto the AudioManager. The AudioManager then quickly looks up which AudioMeeting this connection is in, and which AudioConnection is supposed to handle this connection. If none can be found, the server will close/block the connection. If found, the AudioManager passes the message directly to the AudioConnection object. The AudioConnection object then puts it in its buffer/queue for re ordering and buffering. It then returns the current thread.

While this is all happening in the server, there is a separate thread running constantly in the AudioMeeting, similar to the VelvetClient. This thread runs a function (doPumpWithoutMixing) every 20 milliseconds (the length of time an audio packet represents, defined in VoiceMessage.java) to push audio to every other client in the meeting. Each time the function is run, it first pops audio for every AudioConnection in the AudioMeeting (if possible), and sends it to every other connection in the AudioMeeting. Note that the AudioMeeting uses a basic interface for this, so that sending audio to be recorded will work correctly.

Once a client receives audio from the server, it performs almost the exact same behaviour as the server. That is, it puts the audio in a queue, one for each client, and pops the audio from the queues every 20 ms for playback on the speaker line. A software audio mixer is also provided that mixes different user's audio.

FIG. 5 shows a flow diagram of a process for connecting one computing device to another computing device for a meeting. The process starts at step 501. At step 503, the first computing device detects a first writing action. That is, a first physical writing action being performed on a first physical writing surface, such as a portion of a document, is detected at the first computing device. According to this example, the detection is performed in association with an electronic pen system as described above. It will be understood that any other writing detection system may be used.

At step 505, the first computing system generates a first writing signal based on that detected first physical writing action.

At step 507, the first computing device transmits the first writing signal from the first computing device to the server.

Subsequently or concurrently, a second computing device is also detecting a second writing action at step 509. That is, a second computing device detects a second physical writing action that is being performed on a second physical writing surface (e.g. a portion of the document).

The second computing device generates a second writing signal based on the detected second physical writing action at step 511.

At step 513, the second computing device transmits the second writing signal from the second computing device to the server.

Therefore, the server receives both the first writing signal from the first computing device and the second writing signal from the second computing device, as described in more detail below. Upon receipt, the server forwards the first writing signal to the second computing device and forwards the second writing signal to the first computing device. That is, the first computing device receives the second writing signal from the server at step 515. Further, the second computing device receives the first writing signal from the server at step 521. The first computing device then generates an output, in this example, a display, of the first and second writing signals at step 517. The process then ends at step 519 for the first computing device. At the second computing device the second computer generates an output, in this example in the form of a display, of the second and first writing signals at step 523. The process then ends with step 525.

FIG. 6 shows a flow diagram of a process according to an alternative example where the first computing device is connected to two or more other computing devices for a meeting. According to this example, one of the computing devices is associated with a host of the meeting (steps 603, 605, 607, 615, 617, 619). One or more of the other computing devices are associated with attendees of the meeting (steps 609, 611, 613, 621, 623, 625). For example, the host may be a teacher and the attendees may be students. The process starts at step 601.

At step 603, the first computing device (host) detects a first writing action. That is, a first physical writing action being performed on a first physical writing surface, such as a portion of a document, is detected at the first computing device. That is, the detection is performed in association with an electronic pen system as described above.

At step 605, the first computing system generates a first writing signal based on that detected first physical writing action.

At step 607, the first computing device transmits the first writing signal from the first computing device to the server.

Subsequently or concurrently, a second computing device (attendee) is also detecting a second writing action at step 609. That is, a second computing device detects a second physical writing action that is being performed on a second physical writing surface (e.g. a portion of the document).

The second computing device generates a second writing signal based on the detected second physical writing action at step 611.

At step 613, the second computing device transmits the second writing signal from the second computing device to the server.

Further computing devices (attendees) may also be generating writing signals for transmission to the server, as indicated by the dots in FIG. 6.

Therefore, the server receives all the writing signals from all of the computing devices (host and attendees), as described in more detail below. Upon receipt, the server forwards the first writing signal (host) to all of the other computing devices (attendees) in that meeting. The server also forwards all of the other computing devices writing signals (attendees) to the first computing device (host). That is, the first computing device receives all the writing signals for that meeting from the server at step 615. Further, the second computing device (and other computing devices in the meeting) receives the first writing signal from the server at step 621. The first computing device then generates an output, in this example, a display, of the first and further writing signals at step 617 according to a number of different options, which are explained with reference to the user interface shown in FIGS. 9A to 9K. The process then ends for the first computing device at step 619. At the second computing device (and further computing devices in the same meeting) an output is generated, which in this example is in the form of a display. The output at step 623 is of the second and first writing signals only. That is, the second computing device can only display the writing signals generated by the host's computing device and its own computing device. The process then ends at step 625.

The process is repeated for each writing action. A writing action may be multiple strokes, a stroke or partial strokes of the pen.

It will be understood as shown in FIG. 6 that further computing devices may perform the same actions as shown in steps 609, 611, 613, 621, 623 to allow a one-many connection via the server for showing a meeting. That is, the meeting sharing procedure enables users to share the physical writing actions being performed on a physical medium with other users also sharing their physical writing actions on physical mediums.

Further, as explained above, it will be understood that the first writing signals that are being output from the first computing devices may be output prior to transmitting the generated first writing signal to the server. Further, it will be understood that the second or further writing signals being generated by the second or further computing devices may be output prior to transmitting the generated second (or further) writing signals to the sever.

Also, it will be understood that the representation being displayed on a screen connected to the computing devices of the physical writing actions may be shown in relation to a virtual writing space that corresponds with the physical writing surface on which the physical writing action is being performed. That is, the image shown on the screen may represent a piece of paper upon which the user is actually performing the physical writing actions. That is, the user may select via a menu dropdown the type of paper upon which they are performing the physical writing actions. Further, the position of the physical writing actions in relation to the physical writing medium may be detected by the computing devices via the pen systems in order to display the representation of the physical writing actions of the virtual writing spaces in a position that corresponds with the position that the physical writing actions were originally being performed on the physical writing surfaces.

In accordance with the one-to many representation process of FIG. 6, it is clear that a first computing device receives all the writing signals of the remaining computing devices and outputs a representation of the physical writing actions based on its own generated writing signal and the received writing signals from the other computing devices. Further, the other computing devices (one or more) receive the writing signals from the first computing device only (via the server) and output a representation of the physical writing actions based on its own generated writing signal and the writing signals received from the first computing device only.

It will be understood that the computing devices include a rendering process to render the writing signals on the user interface. Any suitable rendering process may be used.

Optionally, any suitable compression and decompression process may be used when transmitting and receiving various data packets at various points throughout the system.

It will be understood that the server may be connected to a publically accessible network. For example, the server may be located in the cloud to enable any user with a suitable user name and login to access the server functions.

Therefore, it can be seen that the processor forwarding the writing signals from the computing devices involves the step of forwarding to each of the multiple computing devices all the writing signals that have been generated by all of the other computing devices. Further, the writing signal generated by a particular computing device may not be forwarded to that particular computing device to avoid duplication. That is, a writing signal generated by particular computing devices does not need to be sent from the server back to that computing device. That is, the server is arranged to only send writing signals to computing devices that have not been generated by those computing devices. The writing signals generated by those computing devices are stored locally and output locally in real-time.

It will be understood that certain electronic pen systems available may require calibration of the pen detection algorithms. That is, the IR and/or ultrasound transmitters may not be located at the tip of the pen but may be a particular distance away, such as 1c, for example. This can cause an error in terms of the detected position of a 1 cm diameter circle. This error may vary between left and right handed people and also between different personal styles of writing. In order to minimize the error, the herein described system and method performed at the computing device provides a calibration option for the users of the system.

The calibration option includes the steps of the user first positioning the pen at an angle of 90° to the paper surface. The desktop application running on the computing device is notified of this position by the user. For example, by the user selecting a calibration option on the desktop application. The user then subsequently positions the pen with at the user's normal writing position at the same location on the paper. This position is then sent to the desktop application. The difference in the location readings is used as a calibration in order to minimize the variable writing error. Typically the error circle may be reduced from 10 mm to 2 mm.

From the perspective of the server, the server enables the sharing of physical writing actions by receiving generated writing signals that are associated with a meeting from two or more computing devices. These generated writing signals are associated with physical writing actions captured by the two or more computing devices. The server then forwards to the computing devices the generated writing signals associated with the meeting to enable each computing device to output a representation of the physical writing actions.

For example, the server receives a first writing signal from a first computing device. The first writing signal is based on a first physical writing action being performed on a first physical writing surface detected at the first computing device. The server also receives a second writing signal from a second computing device. The second writing signal is based on a second physical writing action being performed on a second physical writing surface detected at the second computing device. The server then forwards the first writing signal from the server to the second computing device and forwards the second writing signal from the server to the first computing device. This therefore enables the first computing device and the second computing device to output a representation of both of the detected first and second physical writing actions.

The server may transmit to the first computing device all the writing signals of the remaining computing devices to enable the first computing device to output a representation of the physical writing actions based on its own generated writing signal and the received writing signals.

The server may transmit to one or more of the plurality of computing devices the writing signals from the first computing device only. This enables the one or more of the plurality of computing devices to output a representation of the physical writing actions based on the one or more of the plurality of computing devices own generated writing signal and the writing signals received from the first computing device only.

The writing signals may be forwarded by the server by forwarding to each of the plurality of computing devices all writing signals that have been generated by all of the other computing devices. The writing signal generated by a particular computing device may not be forwarded to that particular computing device.

The generated writing signals are received by the server in real time.

The server may store each of the writing signals at the server for retrieval by the plurality of computing devices after completion of the meeting.

The writing signals may be part of a personalised workspace associated with each computing device associated with the meeting.

The server may record the physical writing actions that occur in a meeting for a particular user. The server may record all physical writing actions associated with a host of a meeting and attendees of the meeting. Further, the server may send to a computing device associated with the host of meeting, all the recorded physical writing actions.

The server may record all physical writing actions associated with a host of a meeting and attendees of the meeting. The server may send to a computing device associated with a first attendee of the meeting a combination of the host's recorded physical writing actions and the physical writing actions of the first attendee of the meeting to the first attendee, while excluding the physical writing actions of other attendees.

Further, the server may record personalised audio signals in addition to the physical writing actions associated with a meeting.

Figure 7A:
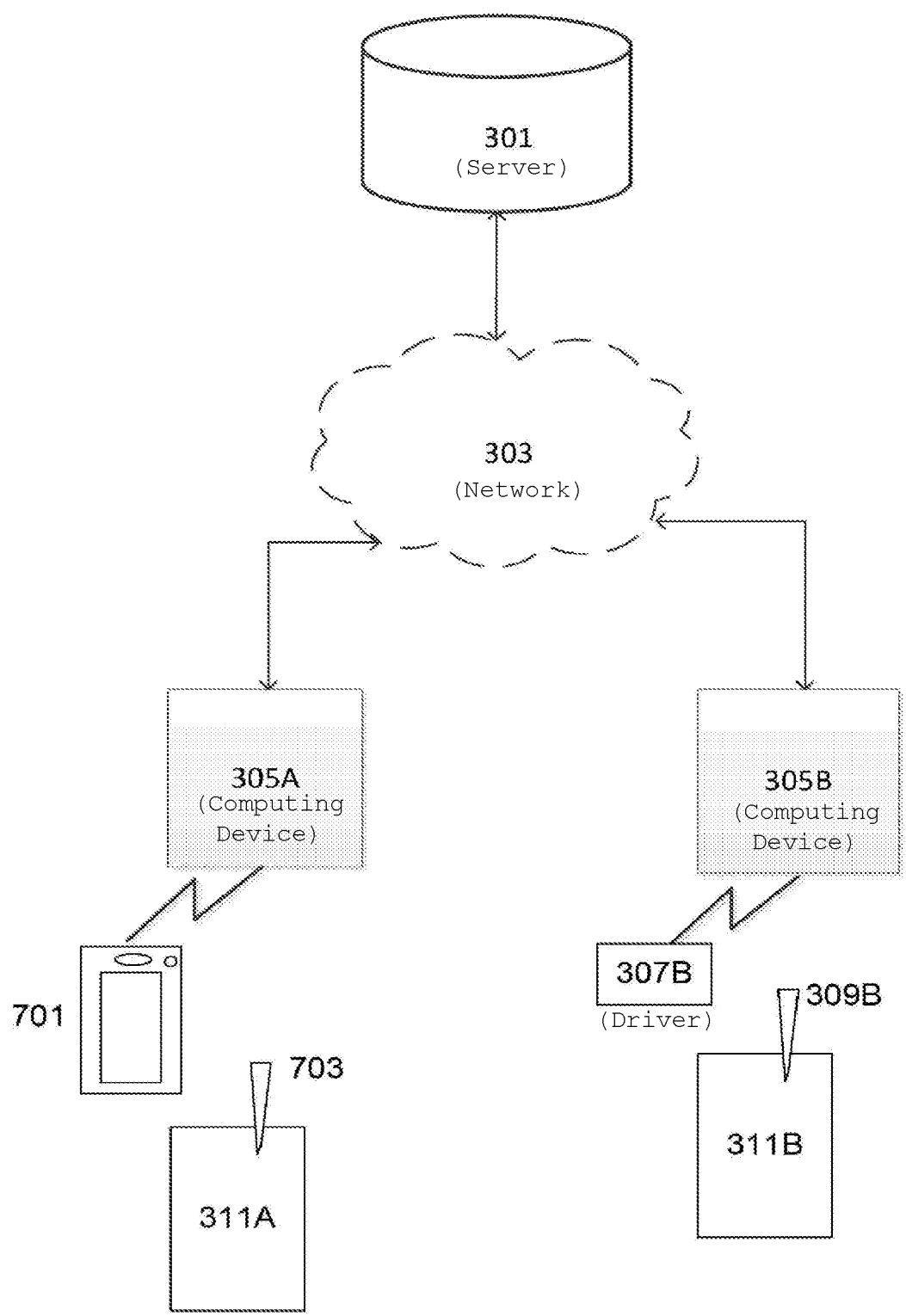
FIG. 7A shows a system block diagram according to this disclosure.

FIG. 7A shows a system block diagram of a similar system to that shown and described in relation to FIG. 3A. According to this example, the first computing device 305A is not connected to a standard electronic pen system. The standard electronic pen system of FIG. 3A is replaced with a camera or an electronic device 701 including or incorporating a camera, as described with reference to FIGS. 2A and 2B. Alternatively, a camera incorporated into a computing device as described with reference to FIGS. 1A and 1B may be used. Further, the electronic pen 309A is replaced with a standard non-electronic pen 703.

In this example, the second computing device 305B is using the writing detection system as described with reference to FIG. 3A.

Figure 7B:
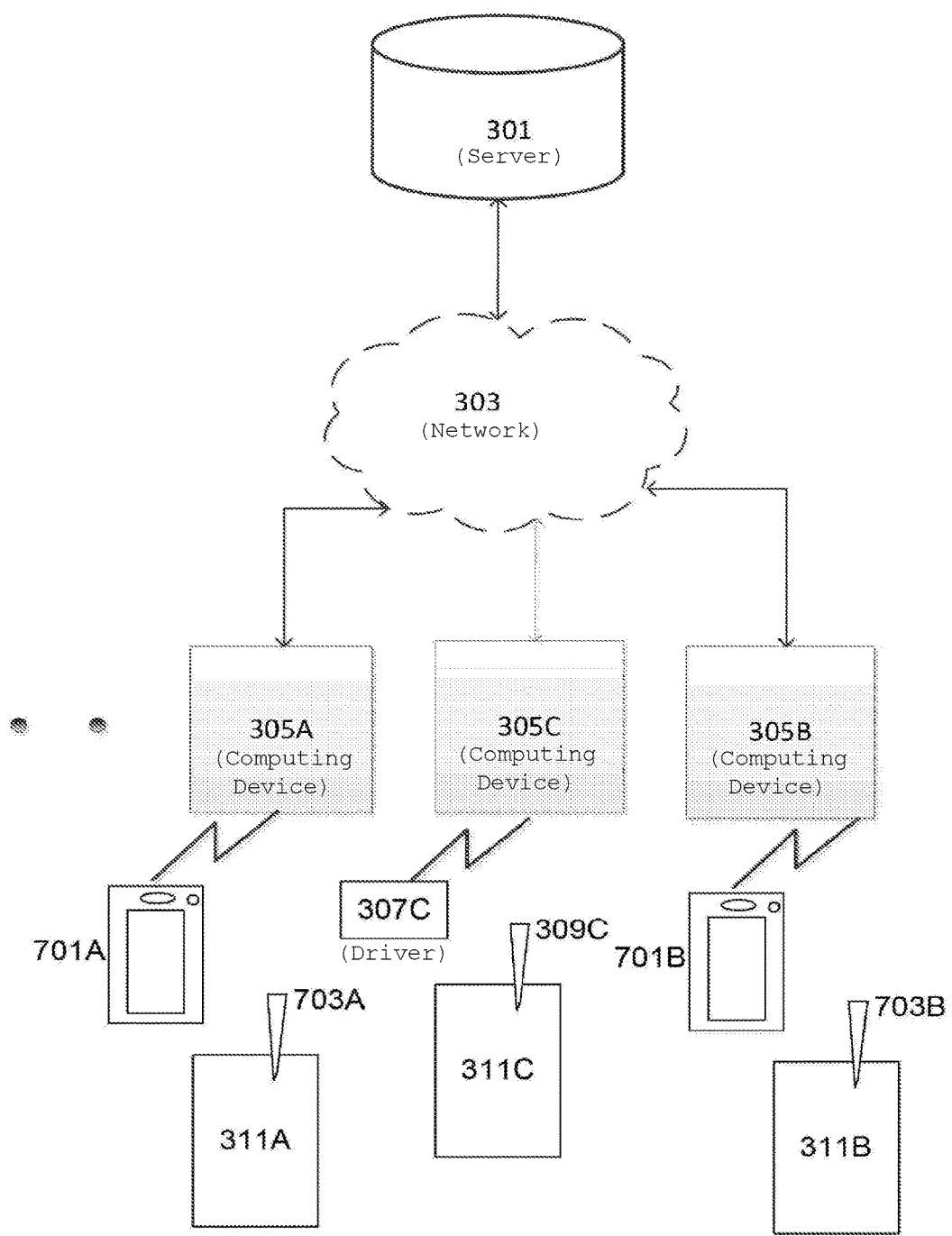
FIG. 7B shows a system block diagram according to this disclosure.

Further, FIG. 7B shows a system block diagram of a similar system to that shown and described in relation to FIG. 3B. According to this example, the first computing device 305A and second computing device 305B are not connected to standard electronic pen systems. The standard electronic pen system of FIG. 3B is replaced with a camera, or an electronic device (701A, 701B) including or incorporating a camera as described with reference to FIGS. 2A and 2B, or a computing device incorporating a camera as described with reference to FIGS. 1A and 1B. For example, the device may be a smartphone or tablet device with an inbuilt camera. The device may be positioned in or on a stand or base to hold the camera steady.

In this example, the further computing device 305C is using the writing detection system as described with reference to FIG. 3B.

Further, the electronic pens (309A, 309B) are replaced with standard non-electronic pens (703A, 703B). The pens (703A, 703B) may be the same or different. In this example, the third computing device 305C is using a standard electronic pen system as described with reference to FIG. 3B. It will be understood that any other combination of standard electronic pen systems and the herein described camera system for detecting physical writing actions may be connected to the computing devices.

This electronic (or computing) camera device is arranged to detect a physical writing action via the lens of the camera. That is, the device incorporates a software algorithm that performs the process of accessing an image generated by the camera associated with an electronic device. It will also be understood that the electronic device may also be a computing device as described with reference to FIGS. 1A and 1B where a camera (e.g. a webcam) is connected to that computing device.

The electronic (or computing) device also performs the process of analysing the image to detect a first physical writing action. The device generates a first writing signal based on the analysis and then outputs that generated first writing signal. The generated writing signal may be stored either locally in local memory or externally. For example, the generated writing signal may be stored on a connected external memory or transferred to the server. The transfer to the server may be in real time.

The device is arranged to detect within the image a plurality of edges of the writing surface upon which the writing actions are being performed. The device defines a boundary of the writing surface based on the detected edges, and then defines a number of distinct areas within the defined boundary. The device then analyses the image to detect a first physical writing action in one or more of the defined areas based on the detected movement of the writing implement being used, and in particular the detected movement of the writing tip of the writing implement.

In order to determine whether the writing implement is actually making a mark on the physical writing surface and not just being moved in the air, the device is arranged to only record the movement being tracked if a determination is made that actual writing has occurred.

That is, the device is arranged to analyse the image in order to determine whether writing has occurred on a physical writing surface, and, upon a positive determination, analyse the image to detect the writing tip of the writing implement performing the first physical writing action, detect movement of the writing tip in the area previously defined within the boundary, and then generate the first writing signal based on the detected movement. In this way, the detection of physical writing enables the device to accurately record the movement of the writing tip to record the writing action. As soon as the device detects that a mark is not being made on the writing medium, the recording of the physical writing action is paused. It should be understood that the camera lens is not merely recording the action of physical writing, but is recording the movement of the writing implement (and in particular its tip) only upon the detection that a physical writing action is occurring. That is, movement of the tip is constantly being monitored, but the recordal of a writing action is only made upon detection within the image that a physical writing action is occurring (i.e. a mark is being made).

The device is in communication with the computing device 305A and may utilise a database of writing implements either stored on the computing device 305A or in the server 301 to enable detection of the type of writing implement within the image. By accessing the database, a comparison of the sub-image of the detected writing implement may be made with images of writing implements in the database. Upon determining the type of writing implement based on the comparison, the server 301 or computing device 305A may use the data in the database entry for that writing tip to determine the physical location in space of the writing tip of that writing implement.

Therefore, this writing detection system and method may be used in conjunction with the writing collaboration system also described herein. The writing detection system provides reliable optical/camera based detection.

The following steps provide reliable writing detection. The software operates by classifying and analysing the image content for characteristic (pen) features in the consecutive frames using the following steps:

Edge detection: This is used to identify points in an image at which the image changes sharply. An edge is a boundary between two regions with relatively distinct properties.

Detect/Follow identified areas in image: This allows detection of movement in particular areas within the image. The contour detector combines areas based on spectral clustering.

Detect Pen objects in image: First, a classifier is developed. After a classifier is developed, the classifier can be applied to input images collected from the camera. Cascade classifiers may be used as a machine learning method for training the classifier to detect an object in different images; in this case the image of the pen and the tip of the pen.

Detect new writing in image: This allows automatic detection of actual writing actions occurring for the purpose of classifying the pen action as active or non-active. This allows classification of pen movements to write or non-write modes based on whether actual writing has occurred or not.

Therefore, the system can detect physical writing actions being performed using a writing implement (e.g. a pen) that is writing on any type of surface, such as a piece of paper or a whiteboard, which is visible to the camera. The camera based solution may detect the pen and follow its movement in relation to defined areas within a defined boundary, and subsequently display the written images or text on a display connected to a computing device. The pen can be moved in three-dimensional space and tracked by the camera relative to the areas and boundary based on the images captured by the camera. Corresponding images may be displayed on a display of the computing device. The camera tracks the different positions of the pen while a user is writing or drawing and then either stores the data to be uploaded later or transmits the data simultaneously to a computing device. The computer displays the images and text drawn on the surface. The computer may be located anywhere, as long as it is able to communicate wirelessly with the camera, and be able to display the written text or images.

FIG. 8 shows a process flow diagram. The process starts at step 801. At step 803, an image captured by the camera is accessed. At step 805, the image is analysed to detect a physical writing action. At step 807, a writing signal is generated. At step 809, the writing signal is output. The process then ends at step 811.

FIGS. 9A to 9K show a number of images of a user interface that may be generated at one or more of the computing devices (305).

Figure 9A:
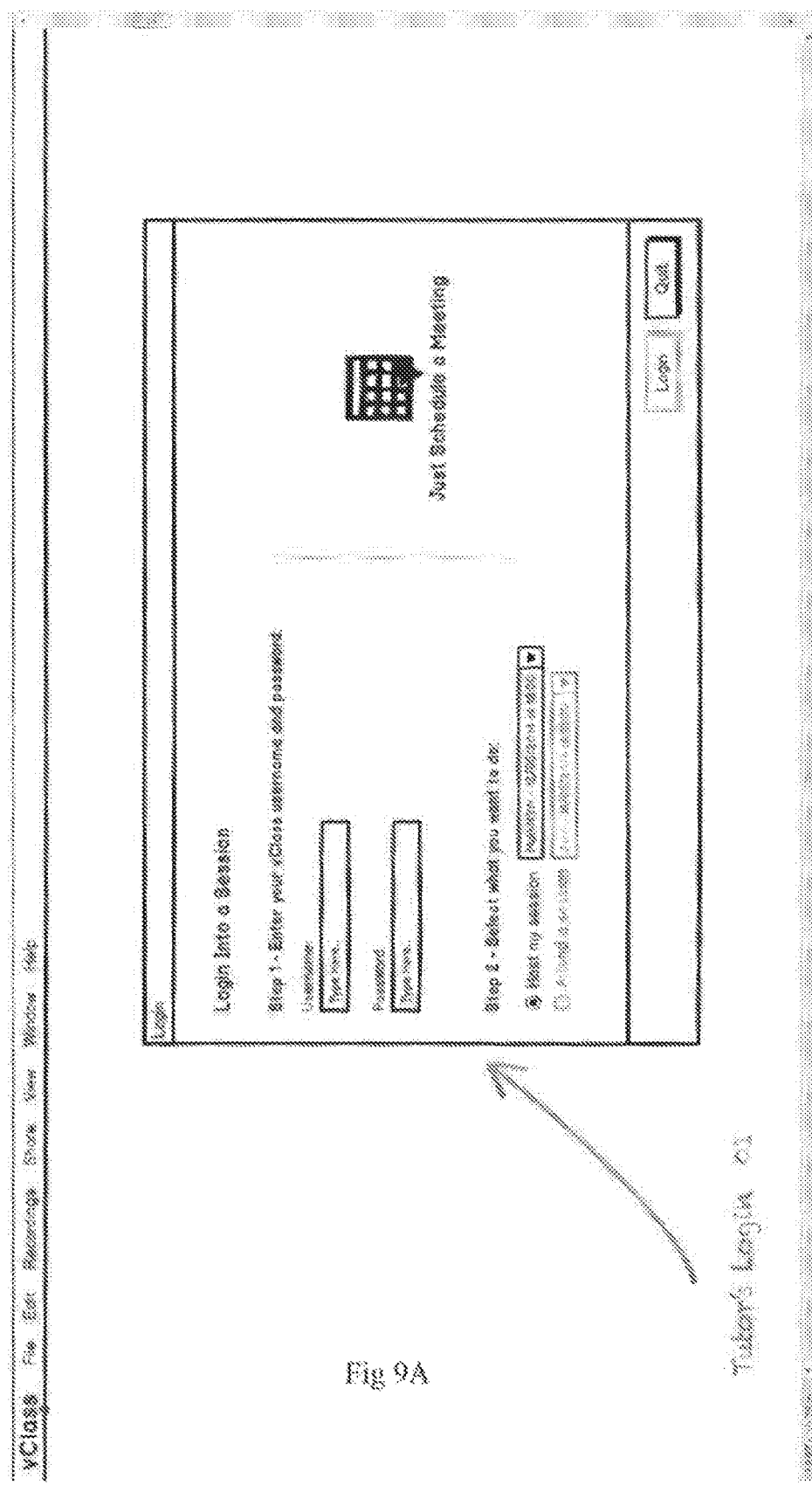
FIGS. 9A to 9K show a user interface according to this disclosure.

FIG. 9A shows a user interface screen displayed by the desktop application running on the computing device operated by a host of a meeting. The host may be a teacher for example.

The user must enter a user name and password to log in to a session. The use then has the option to host a particular session such as a "math NSW" session. Alternatively, the user may attend a particular session that is being hosted by someone else.

Alternatively, the user may schedule a meeting with another user.

Figure 9B:
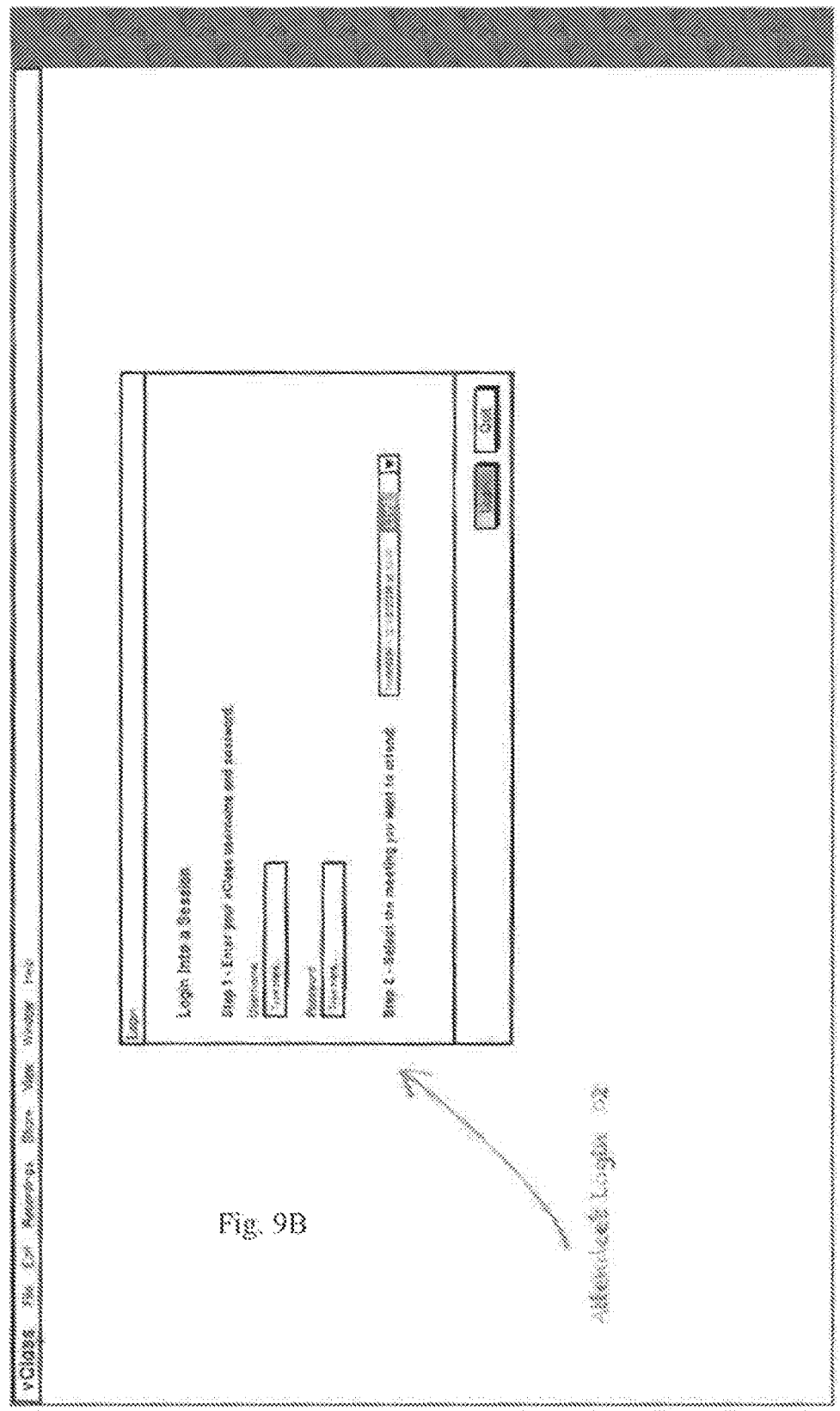

FIG. 9B shows a further user interface. This user interface is displayed by a desktop application running on a computing device operated by another user. In this case, the user is not a host but is an attendee of a meeting being run by a host. The attendee must enter their username and password to log in to a session. The user may then select a meeting that they have been invited to by a host in order to attend that meeting. An indicator is provided in the dropdown list of available meetings for that particular user to show whether the meeting has already started or not. Upon selecting login and the system confirming their login details are correct, the user is then taken to a landing page upon which they can view a canvas of the meeting. The canvas displays all the physical writing actions that have been performed by the host of the meeting. Further, the canvas also shows the physical writing actions that are being performed by the attendee. The physical writing actions of the other attendees are not shown on the attendees screen.

Figure 9C:
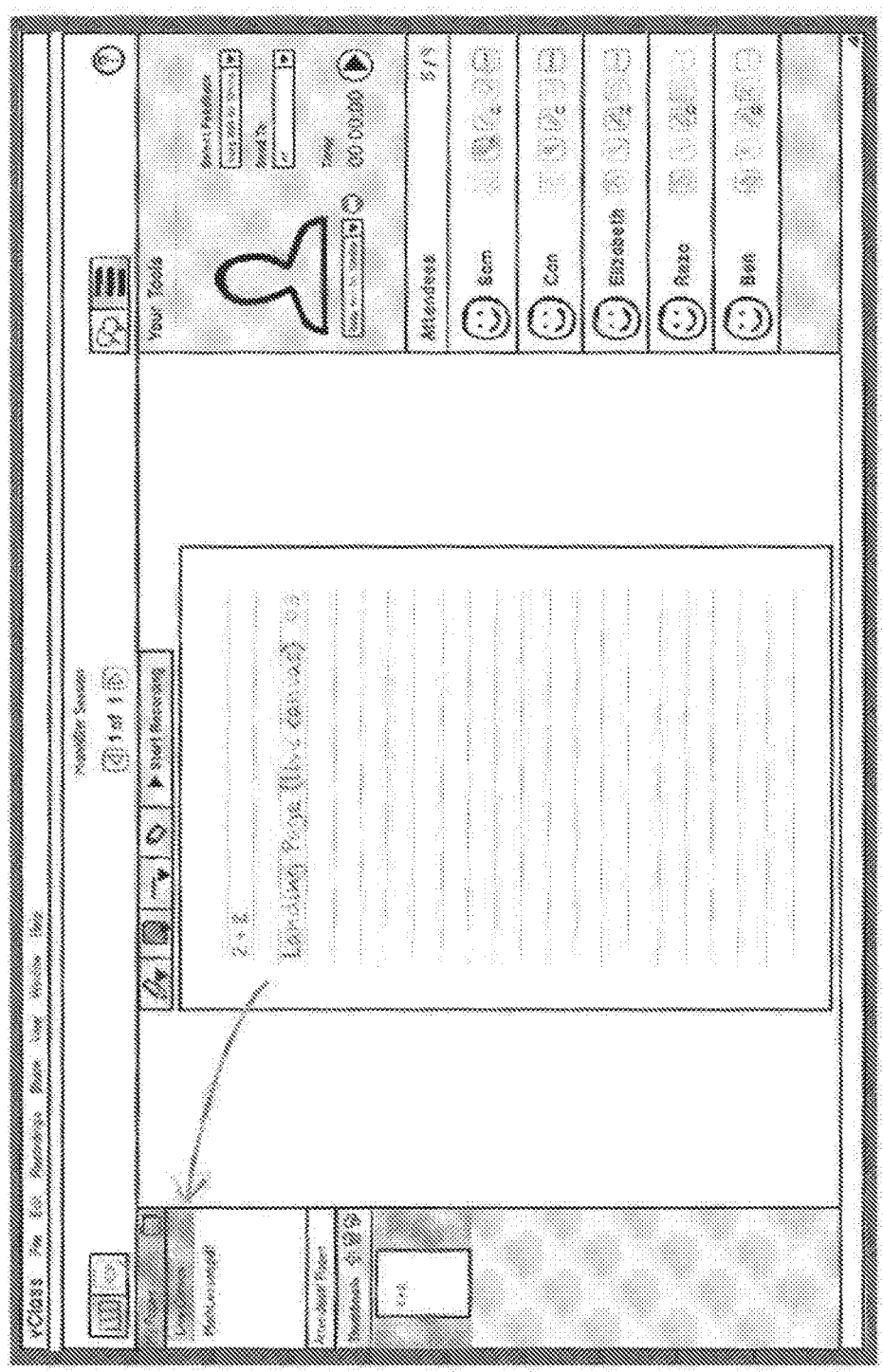

FIG. 9C shows a user interface for the host of the meeting (all session) a large canvas page (virtual writing space) is shown for this session. The page indicates all physical writing actions that have been performed by the host. A window is provided within the user interface indicating all the attendees attending the session. A further window is also provided that enables the host to provide feedback to one or more of the attendees.

An option is also provided to start recording the session. The recording of the session will record all the actions performed by the host as well as all the actions performed by all of the attendees to the session. However, each attendee will only be able to access the recording of their own actions and those of the host when they collaborate with the attendee.

Figure 9D:
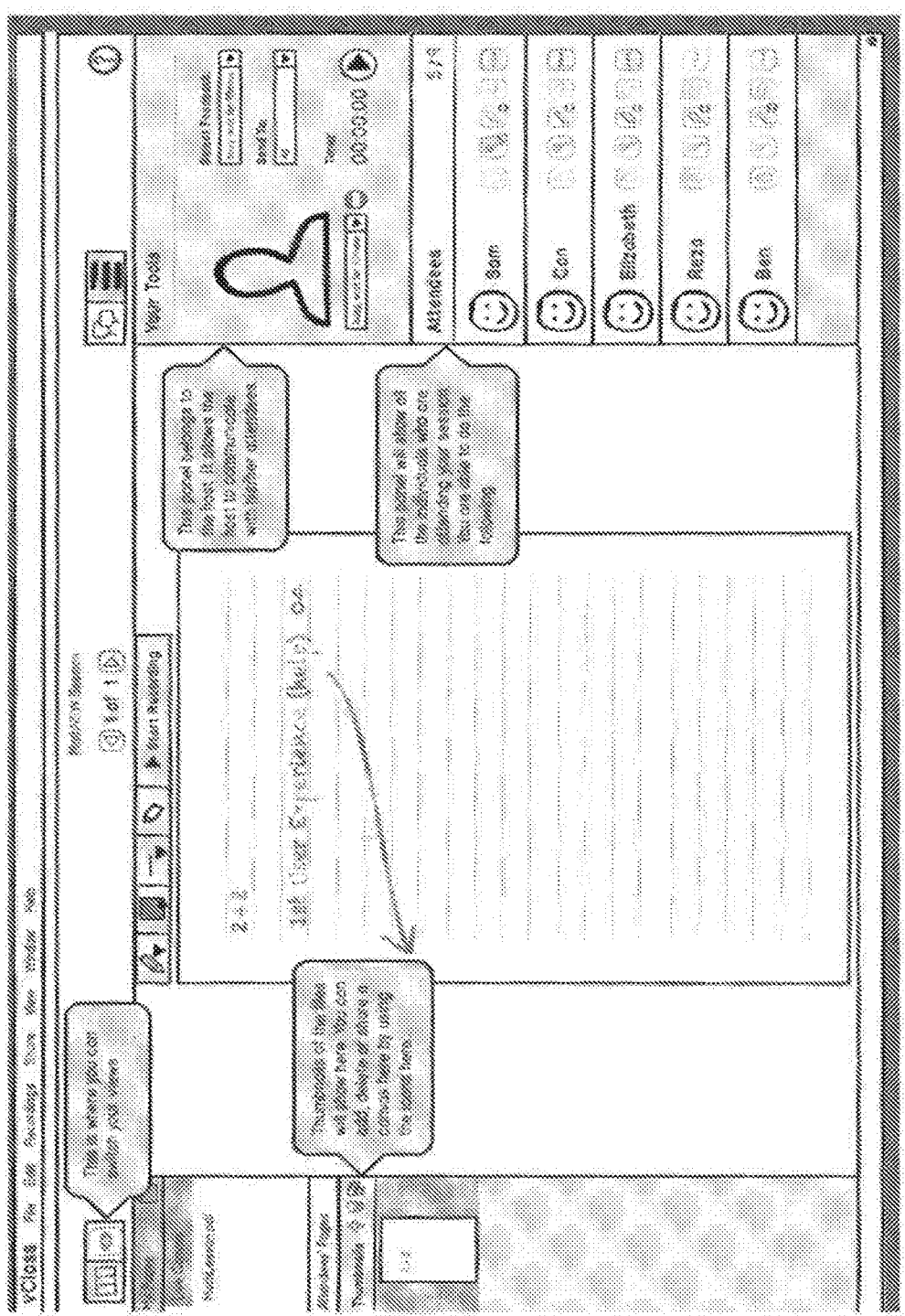

FIG. 9D shows a further user interface available to the host of the session. This interface indicates all the help information available to the host. For example, help information is provided to show the user that various views may be available to the host. As described with reference to FIG. 9G, 9H, 9I.

Figure 9E:
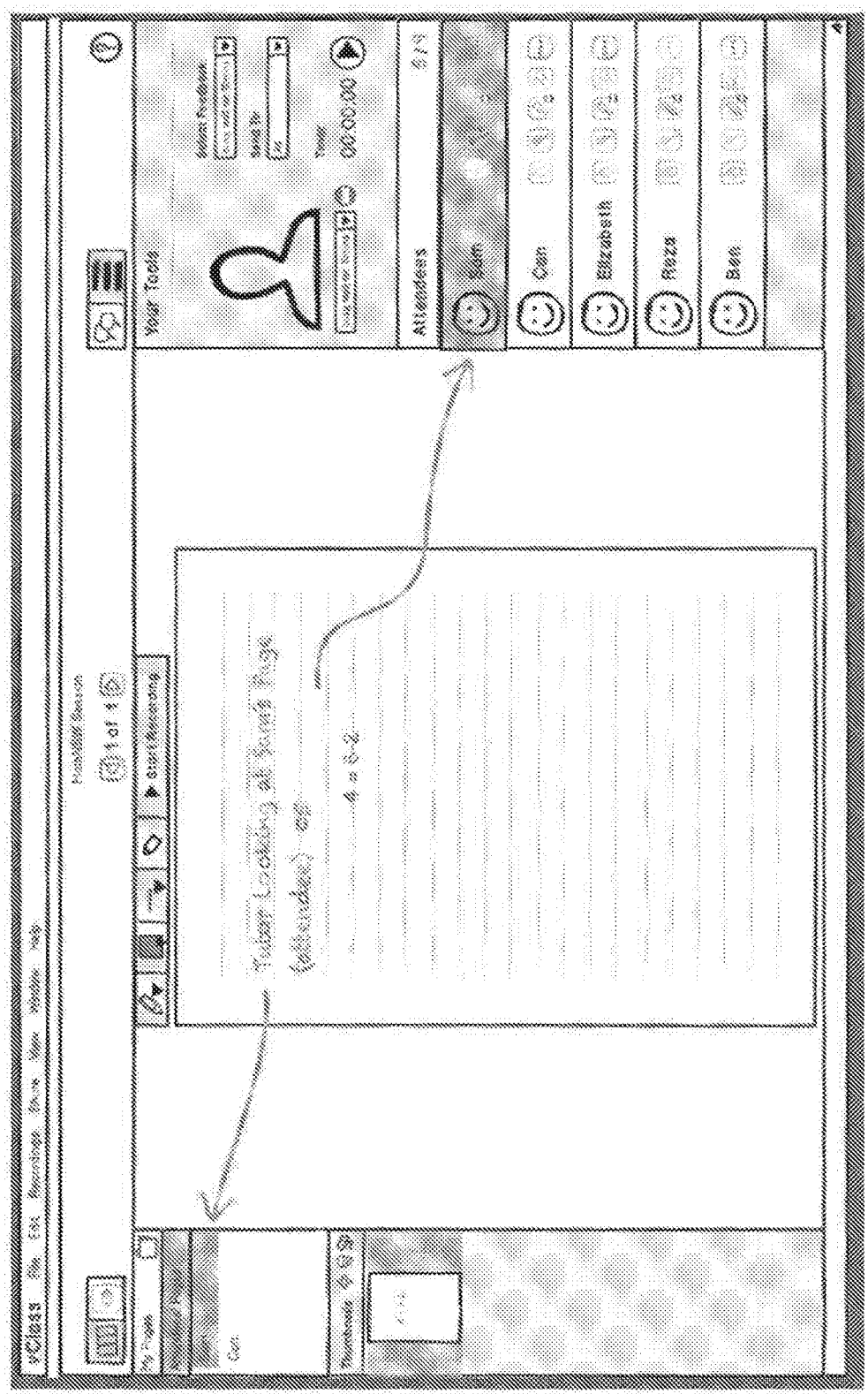

FIG. 9E shows a further user interface for the host. This particular user interface is allowing the host to view the page of one particular attendee (Sam). While viewing this page, the host may perform physical writing actions that are detected by the hosts computing device and forwarded by the server to the attendees computing device for display on the attendee's page. That is, the host may perform writing actions that are then displayed on Sam's page.

None of the other attendees' will receive the same physical writing actions on their pages.

Figure 9F:
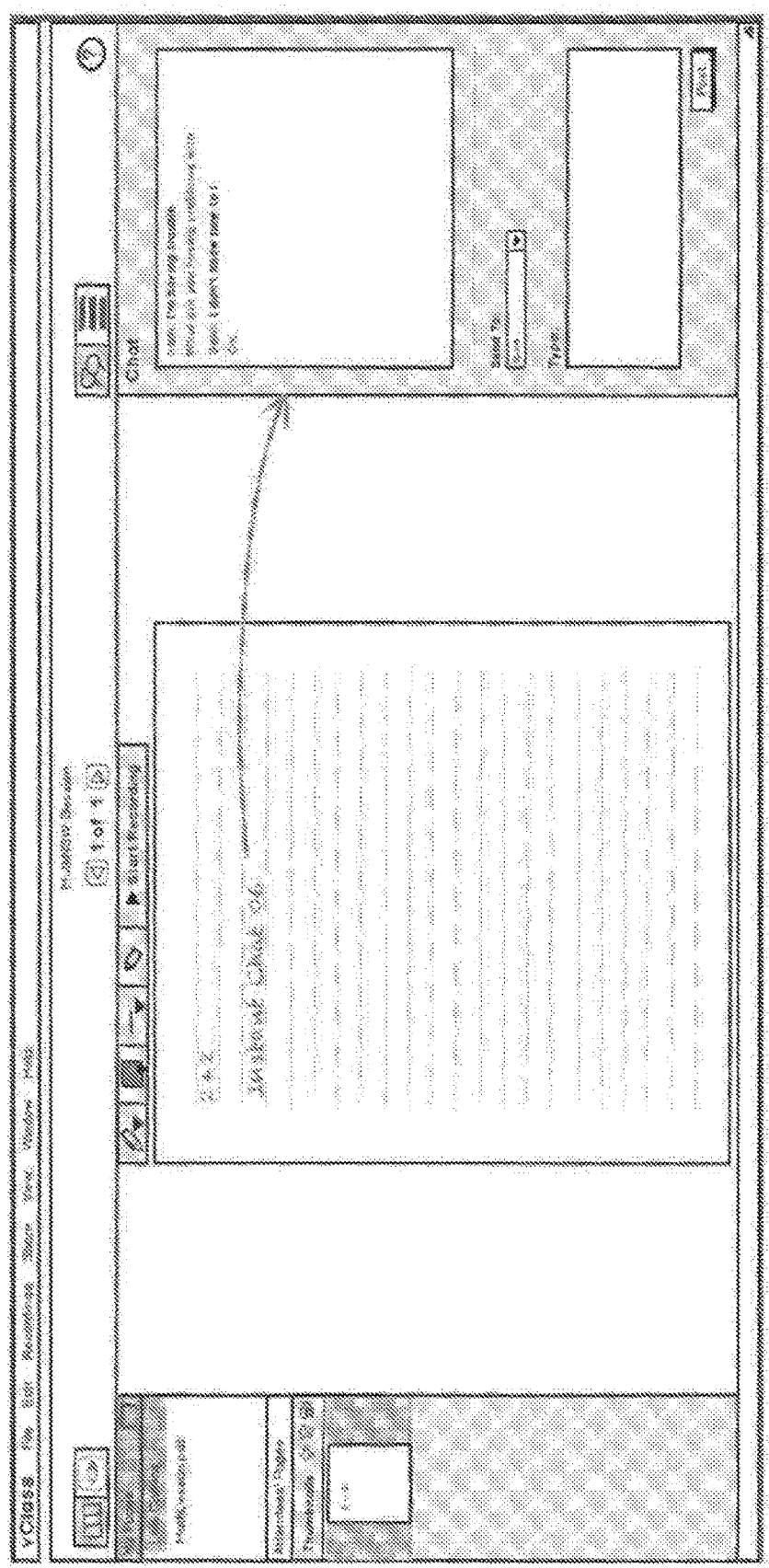

FIG. 9F shows a further user interface available to the hosts and the attendees'. According to this interface, the users may chat with the host to ask questions and provide feedback.

Figure 9G:
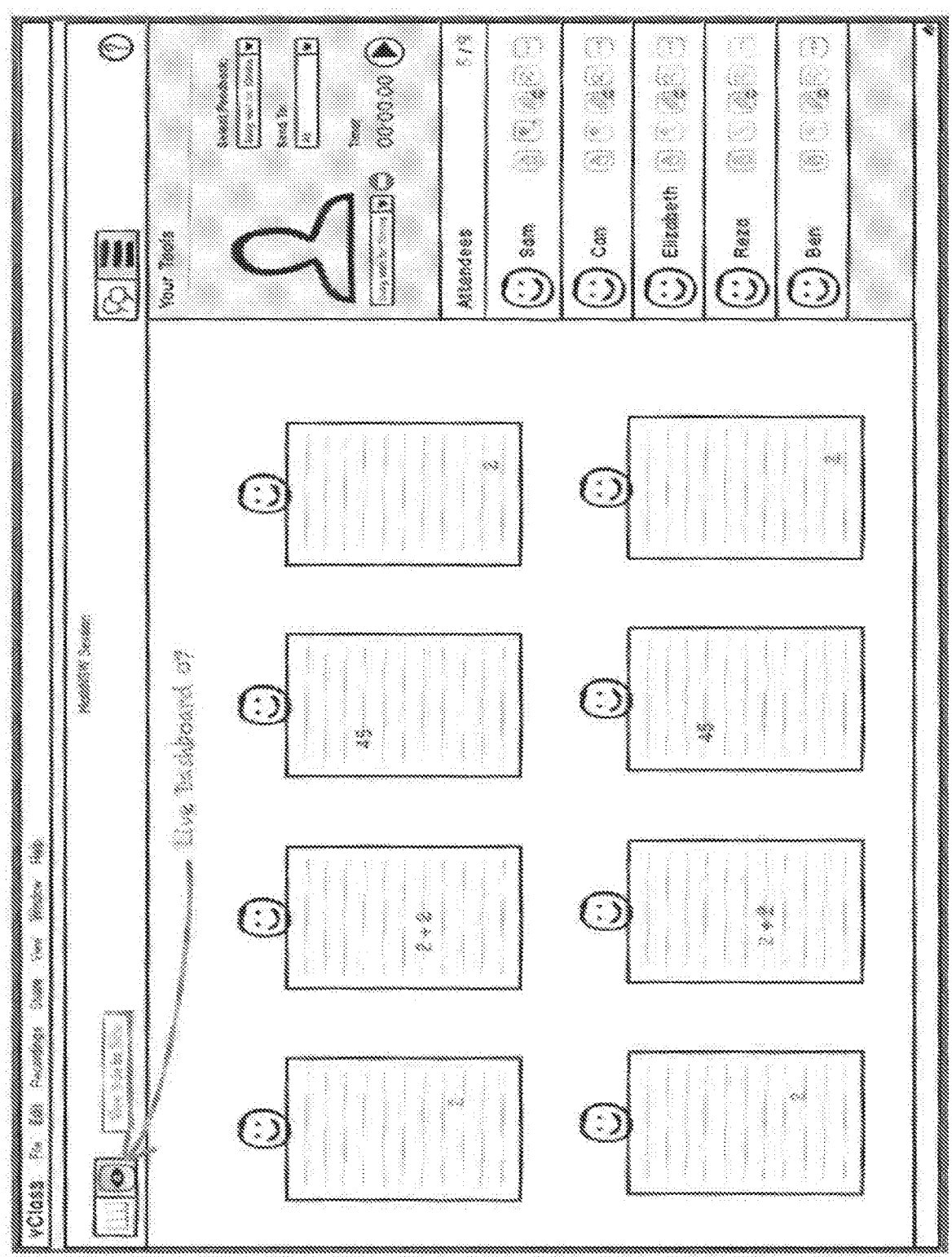
Figure 9H:
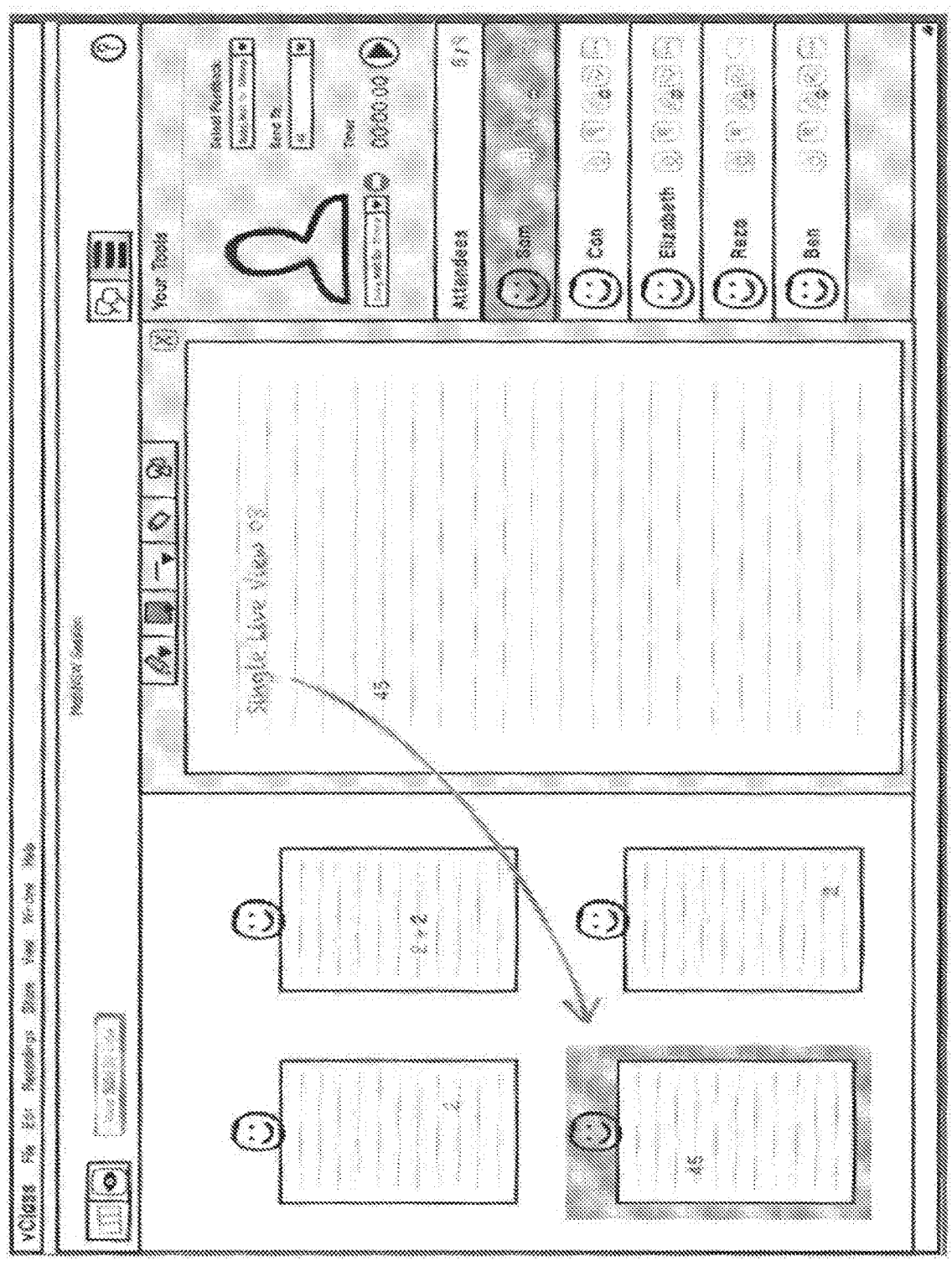
Figure 9I:
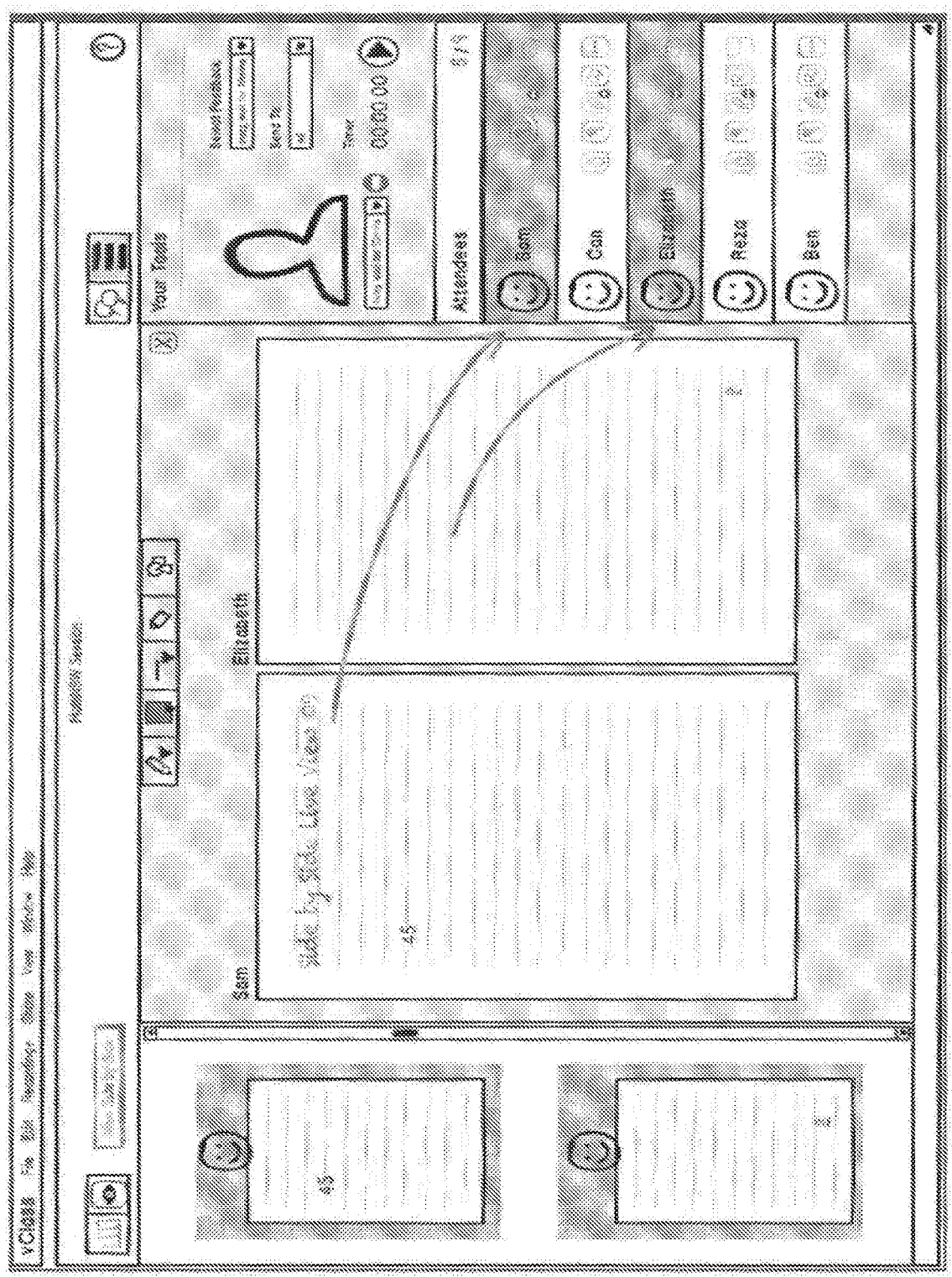

FIG. 9G provides a further user interface available to the host. According to this interface, the host may switch the different views to enable the host to view all of the pages being produced by the individual attendees in one screen. That is, all of the attendee's pages are displayed on the screen available to the host. Further, the host may select an individual's page in order to interact with that user's page. The user interface shown in FIG. 9H shows the host selecting a particular page of a particular user to enable the host to interact with that user via their page.

FIG. 9E shows a user interface where the host may select two or more users to view the pages of those users side-by-side in order to make a comparison. That is, the physical writing actions of two or more attendees may be monitored by the host and the host may interact with each of those pages to generate physical writing actions that are then transmitted to those individual attendees.

Figure 9J:
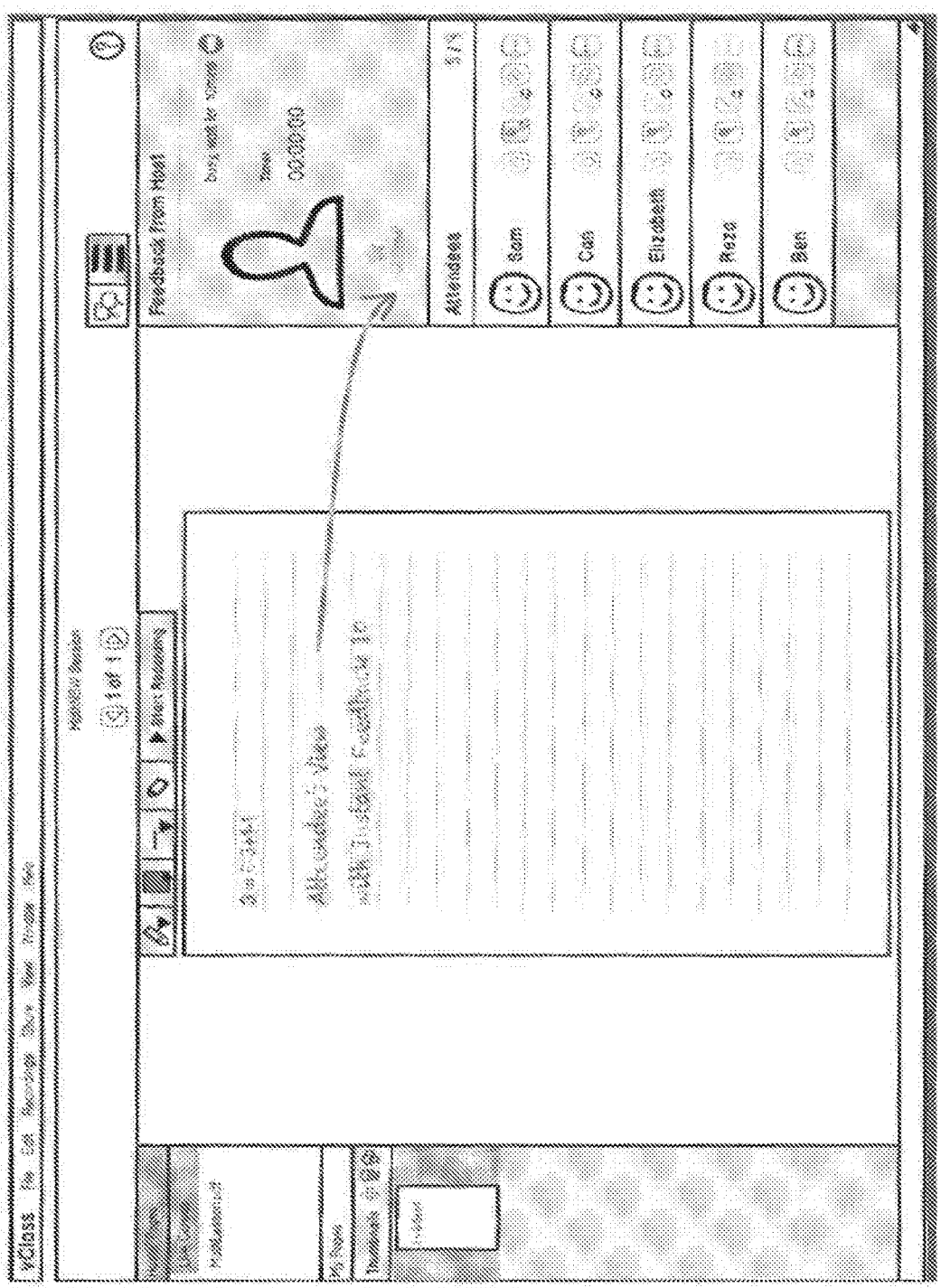

FIG. 9J shows a user interface available to an attendee of the session. The attendee's virtual writing space is displayed here. It shows the attendee's writing actions as well as those of the host. Other attendee's writing actions are not shown. According to this user interface, the attendee may receive instant feedback from the host.

Figure 9K:
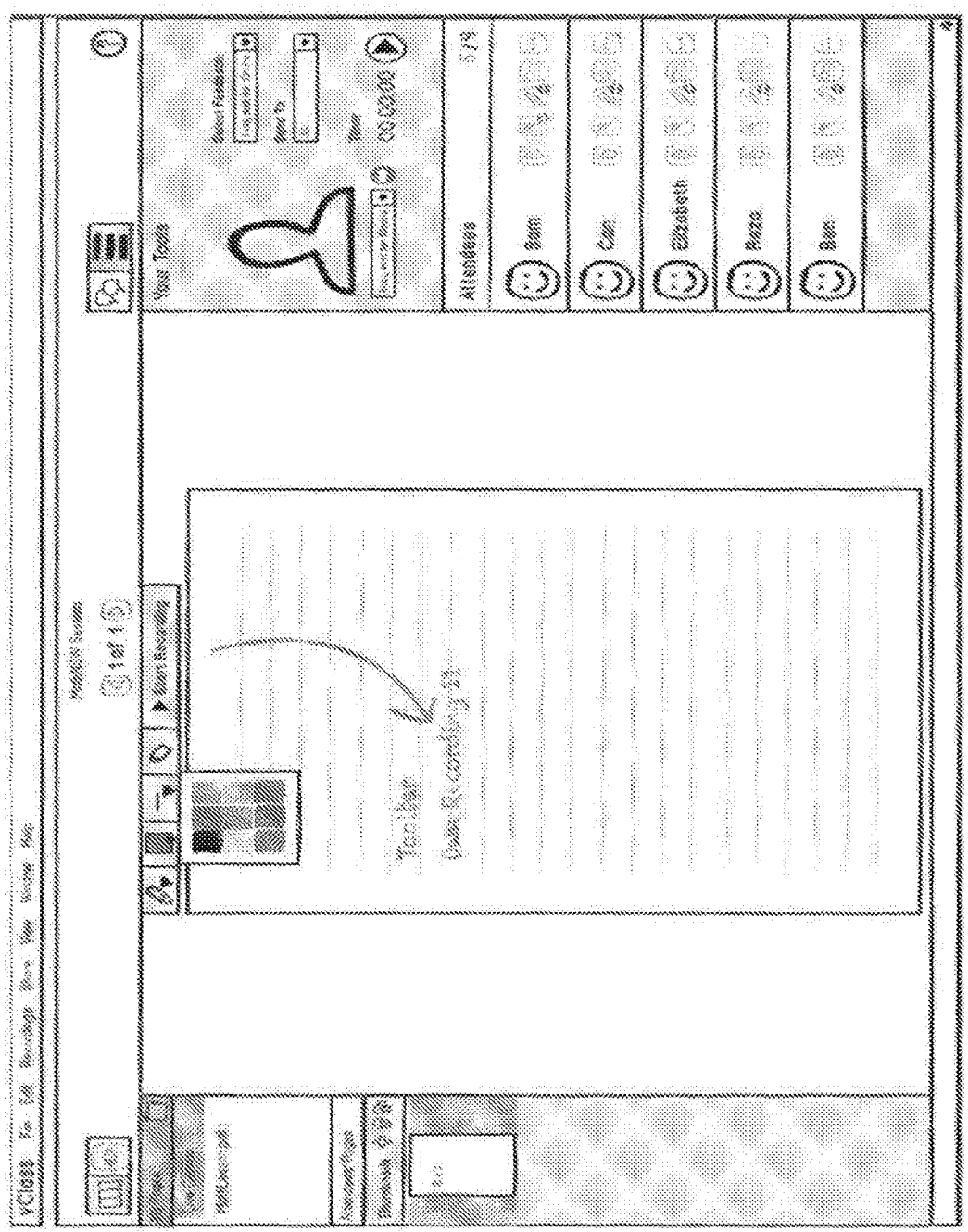

FIG. 9K shows a further user interface available to the host (as well as available to the attendee) wherein the attendees and hosts may record their session. Sessions that are recorded are personalised sessions in the form of a video that records all the physical writing actions performed by both the host and the attendee. Further, audio signals are also recorded alongside the images of the interaction by the screen. Each attendee receives a recording of their own interactions and with the host. The attendees do not receive copies of interactions of other attendee's physical writing actions or audio. That is, any audio signals or voice signals that are generated and forwarded to each of the host and the attendees are personalised for those particular users. That is, each attendee only receives audio that is generated by them or generated by the host. The do not receive any audio from other attendees. Therefore, a personalised voice recording of the meeting is provided to each attendee. Further, the host is able to receive voice recordings from all of the attendees including themselves.

It will be understood that the server may incorporate an algorithm to track which attendee's page the host is viewing and to then link that determination with the ability to enable the host to interact with that attendee via the attendee's page. Also, the server can determine which of multiple pages multiple attendees are viewing in order to assist the host in determining further actions with the attendees. An indication may be provided on the user interface to indicate to the host which of the pages is the active page being viewed by the attendee to assist the host in collaborating and sharing information via that active page.

Further, the server may provide the ability to buffer content between the server and client. These buffers may be used to transmit custom page backgrounds (PDF documents, JPG/PNG images etc.).

Further, synchronisation between the server and the clients may be provided in any suitable form to enable users to leave and join meetings seamlessly. For example, the system enables a user to leave a meeting by choice or because of failure of communication or one of the other peer components. Recovery and restart is the automated continuation of processing for the meeting after failure or restart. The applications are made aware that recovery has taken place. The recovery allows the applications to continue the meeting process with only a short delay. The recovery process will provide for no loss of data in the meeting history.

The live dashboard available to the host enables the teacher to monitor active pages being used by the attendees. The host may monitor the active pages in real time and interact with each attendee or two or more attendees via those active pages.

The various algorithms and software elements (computer program product) may be incorporated within a computer readable medium, which has recorded thereon the computer program for implementing any of the methods as described herein.

It will be understood that the herein described systems and methods may be modified, such as, for example using a web based application that can be accessed across multiple devices. A browser based Plugin may be provided for detection of real-time hand-writing.

Further optical recognition of handwriting through mobile devices may be provided as described herein.

Further, the desktop and the scheduling application may be combined into one web based interface.

Further, it will be understood that users may use a variety of tools to write with, such as pen and lead pencils.

Further, it will be understood that other communication technologies besides Bluetooth may be used to communicate with the electronic base of the pen system and the computing device.

The herein described systems and methods provide the following advantages: Desktop applications are stable and work on main operating systems; There are no lag or latency issues providing real-time collaboration in an instant; The resolution of the displayed writing is very high; The server platform is a cloud based making it easy to access, and secure; Users can write on any notepad they prefer; Pre-printed paper is not necessary; Recordings of meeting collaborations are stored on the server; The group meetings are scalable; The servers are capable of running multiple meetings concurrently.

Various other enhancements may be made to the system to improve functionality. For example, virtual glasses may be incorporated into the system. The virtual glasses include a camera which is used with the pen writing system to pick up the writing actions of the user. Further, the virtual glasses may provide the user with an immersive experience. For example, a student studying at home may wear the virtual glasses and feel as if they are in a real classroom environment. This may assist in reducing distractions. As a further example, augmented reality images may be provided to introduce additional information as well as viewing writing actions from the pen system. According to these systems, the glasses may communicate with a local computer system using Bluetooth, or may communicate with a remote computer system via any other medium such as Wi-Fi or the Internet. The physical elements of writing may be mixed with the virtual classroom, as well as the augmented information.

It will be understood that, as an alternative, a desktop application is not required. The remote computer may be a web server that is in communication with the user's computing device. The web server may take control of the camera of the user's computer or electronic device. The web server may then carry out the process of detecting and processing the hand writing. The movement detection of the pen connected to the user's computer is carried out by a software plug-in executed on the user's computer. The movement data is then transferred to the web server for analysis at the server.

It will be understood that the system may be used to provide online examinations. The camera may be used to monitor the user taking the exam to ensure that the rules of the exam are followed.

It will be understood that the system may incorporate analytical tools to monitor when and how long a user was using the system. For example, the system may monitor the length of time a user was in a virtual class by analysing when writing actions were being recorded.

It will be understood that the server may communicate with a CRM system in order to obtain and utilise corporate information. For example, data may be imported from and shared with the CRM system and associate database to enable access rights to be established. As another example, the CRM system may enable student details to be retrieved and imported into the herein described system.

According to a further example, the system may support distributing, supervising and the collecting of test results in a secure and reliable manner using a cloud based connected service. According to this example, tests may be created via the described cloud-based system. Further, Optical Mark Recognition (OMR) template elements may be supported.

According to the template, identification information for the user may be created automatically. Items and question numbers in the template may be numbered automatically. Written response areas may be created. Different grid layouts may be used to ensure optimal layout of the OMR elements.

Once the form template is finished, it is stored as template information in the cloud database, so the collected forms can be recognized by the system. The form template can be published as a unique form for each recipient, or it can be published as a single unidentified form and copied or printed into as many forms as is needed.

The tests may be distributed using a secure VPN network. All tests are stored temporarily in an encrypted file system via a controller.

The cloud server acts as Certificate Authority (CA) providing a PKI (public key infrastructure). The PKI consists of i) separate certificate (also known as a public key) and private key for the server and each client, and ii) master Certificate Authority (CA) certificate, a key that is used to sign each of the server and client certificates. This supports bidirectional authentication based on certificates, meaning that the client must authenticate the server certificate and the server must authenticate the client certificate before mutual trust is established.

The controller prints the tests out with a laser printer. The forms are then placed in the student unit (i.e. a computing or electronic device that connects the web server).

Identifier codes are included in the forms within the system, so that the system can automatically identify who owns the form and what test it belongs to.

The system collects test results automatically. The system captures people's hand marked responses made in the checkboxes. The system also reads a barcode or QR code data for form-page recognition and uses OMR to detect and capture pen marks made in the checkboxes. Capturing of handwritten text and drawings is also supported. The forms that cannot be collected automatically can be scanned and stored via the controller.

The controller pushes completed test results over the secure VPN connection to the cloud server.

The cloud server automatically marks multiple-choice OMR tests with the services provided. The system exports the captured data to a database/spreadsheet or other management software for further analysis. The system also calculates and provides statistics for the tests performed. Tests, which are uniquely identified as belonging to a specific respondent, will connect the captured data with the respondent's record. Tests which are not bound to a specific respondent will connect with a data table record using a captured ID number, or an automatically generated numeric record will be created in the database.

The cloud based management interface may provide one or more of the following functions:

Publishing a test, the test name and template information is stored in server.

Managing test forms and pages.

Managing test results.

Providing functions for enhancing forms with recognition errors.

An interface may be provided to a customer's IT-system.

The system provides a secure, private reliable service and is able to collect at least 90% results automatically without the requirement for manual scanning.

The controller and Student Units are connected using encrypted communication link over local secure Wi-Fi connection. WPA2 mode with device MAC address filtering may also be used.

The controller provides for:

Temporary storing of tests and test results in encrypted file system.

Connection to the cloud server using VPN.

Connection to Student Units over Wi-Fi.

Acts as WPA2 Wi-Fi access point.

The Student Unit provides for:

Storage for test forms.

Real-time scanning of the test results using pen module and camera.

The necessary battery units.

Simple display unit.

User Interface.

The cloud server provides functionality for:

Publishing a test, where the test name and the associated template information is stored in the server.

Managing test forms and pages.

Managing test results. The cloud server processes the incoming images. When the processor finds a barcode or QR code, the server will detect the ID and look at the ID information in the database, read the form and capture the results from the form.

Provide functionality for enhancing forms with recognition errors.

The arrangements described are applicable to the computer and data processing industries and particularly for the knowledge sharing and teaching industries.

For example, the herein described systems and methods may be used in the following areas: Tutoring Companies locally and globally; Remote Private Tutoring; Distance Education; Remote Language Tutoring; Arts and Design Tutoring; In Classroom Learning; Law-firm Document Annotation and Editing; Flipped Classrooms, On-line collaborations across multiple users. Further, the herein described systems and methods may be used in mining, construction, engineering, legal, healthcare, market research and many other areas where collaboration between two or more entities is required.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

What is claimed is:

1. A server implemented method for sharing physical writing actions, the method comprising the steps of:
   receiving, at a server, generated writing signals associated with a meeting from two or more computing devices, wherein the generated writing signals are associated with physical writing actions captured in an image by the two or more computing devices; and
   forwarding, from the server to the computing devices, the generated writing signals associated with the meeting to enable each computing device to output a representation of the physical writing actions
   wherein the method further comprises the steps of:
      detecting within the image a plurality of edges of a writing surface;
      defining a boundary of the writing surface based on the detected edges;
      defining a plurality of areas within the defined boundary of the writing surface; and
      analyzing the image to detect the physical writing actions in one or more of the defined areas.

2. The method of claim 1 further comprising the steps of:
   receiving a first writing signal from a first computing device at a server, wherein the first writing signal is based on a first physical writing action being performed on a first physical writing surface detected at the first computing device;
   receiving a second writing signal from a second computing device at a server, wherein the second writing signal is based on a second physical writing action being performed on a second physical writing surface detected at the second computing device; and
   forwarding, the first writing signal from the server to the second computing device and forwarding the second writing signal from the server to the first computing device, to enable the first computing device and the second computing device to output a representation of both of the detected first and second physical writing actions.

3. The method of claim 1, further comprising the steps of:
   transmitting to a first computing device all the writing signals of the remaining computing devices to enable the first computing device to output a representation of the physical writing actions based on its own generated writing signal and the received writing signals, and
   transmitting to one or more of the plurality of computing devices the writing signals from the first computing device only, to enable the one or more of the plurality of computing devices to output a representation of the physical writing actions based on the one or more of the plurality of computing devices own generated writing signal and the writing signals received from the first computing device only.

4. The method of claim 1, wherein the server is located on a publically accessible network.

5. The method of claim 1, wherein the step of forwarding the writing signals further comprises the step of:
   forwarding to each of the plurality of computing devices all writing signals that have been generated by all of the other computing devices.

6. The method of claim 5, wherein the writing signal generated by a particular computing device is not forwarded to that particular computing device.

7. The method of claim 1, wherein the generated writing signals are received by the server in real time.

8. The method of claim 1 further comprising the step of:
   storing each of the writing signals at the server for retrieval by the plurality of computing devices after completion of the meeting.

9. The method of claim 1, wherein the writing signals are part of a personalized workspace associated with each computing device associated with the meeting.

10. The method of claim 1 further comprising the step of the server recording the physical writing actions that occur in a meeting for a particular user.

11. The method of claim 1, further comprising the steps of:
    recording, at the server, all physical writing actions associated with a host of a meeting and attendees of the meeting; and
    sending, to a computing device associated with the host of meeting, all the recorded physical writing actions.

12. The method of claim 1, further comprising the steps of:
    recording, at the server, all physical writing actions associated with a host of a meeting and attendees of the meeting; and
    sending, to a computing device associated with a first attendee of the meeting, a combination of the host's recorded physical writing actions and the physical writing actions of the first attendee of the meeting to the first attendee, while excluding the physical writing actions of other attendees.

13. The method of claim 1 further comprising the steps of recording personalized audio signals in addition to the physical writing actions.

14. A server arranged to perform the methods of claim 1.

15. A computer program product including a non-transitory computer readable medium having recorded thereon a computer program for implementing the methods of claim 1.

* * * * *